US012579854B2

(12) United States Patent
Kingston et al.

(10) Patent No.: US 12,579,854 B2
(45) Date of Patent: Mar. 17, 2026

(54) LOCK SYSTEM WITH INTEGRATED SENSORS FOR TRANSLATABLE STRUCTURE

(71) Applicant: Vivint, Inc., Provo, UT (US)

(72) Inventors: Chad Kingston, Provo, UT (US); Christopher Harris, Provo, UT (US); Kris Nosack, Provo, UT (US); Adam Richards, Murray, UT (US)

(73) Assignee: Vivint LLC, Provo, UT (US)

(*) Notice: Subject to any disclaimer, the term of this patent is extended or adjusted under 35 U.S.C. 154(b) by 115 days.

(21) Appl. No.: 18/428,518

(22) Filed: Jan. 31, 2024

(65) Prior Publication Data

US 2024/0257588 A1 Aug. 1, 2024

Related U.S. Application Data

(60) Provisional application No. 63/482,568, filed on Jan. 31, 2023.

(51) Int. Cl.
*G08B 21/00* (2006.01)
*E05B 47/00* (2006.01)
*G07C 9/00* (2020.01)

(52) U.S. Cl.
CPC ...... *G07C 9/00182* (2013.01); *E05B 47/0001* (2013.01); *E05B 2047/0069* (2013.01); *E05B 2047/0094* (2013.01)

(58) Field of Classification Search
CPC ............. G07C 9/00182; E05B 47/0001; E05B 2047/0069; E05B 2047/0094;
(Continued)

(56) References Cited

U.S. PATENT DOCUMENTS 6,654,732 B1 11/2003 Naito et al.
6,748,343 B2 6/2004 Alexander et al.
(Continued)

OTHER PUBLICATIONS

Hossain et al., "Adaptive Interaction Support in Ambient-Aware Environments Based on Quality of Context Information" in Multimed tools Appl (2013) 67: pp. 409-432 (Year: 2013).
(Continued)

*Primary Examiner* — Mark S Rushing
(74) *Attorney, Agent, or Firm* — Nolte Lackenbach Siegel; N. Alexander Nolte

(57) ABSTRACT

A lock system includes a mount, a lock device, a sensor, and a communications interface. The mount configured to be coupled to a first surface located at a wall, the wall defining an opening in which a translatable structure is positioned, the mount including an engagement feature. The lock device configured to couple to a second surface located at the wall and proximate the first surface and includes a locking mechanism configured to engage with the engagement feature to inhibit the translatable structure from translating between open and closed positions. The communications interface configured to communicate signals to cause a controller configured to actuate the locking mechanism to switch between the locked state and the unlocked state to engage and disengage with the engagement feature of the stationary mount in response to the sensor sensing that the locking mechanism and the engagement feature are engageably aligned.

19 Claims, 10 Drawing Sheets

(58) Field of Classification Search
CPC ....... E05B 2047/002; E05B 2047/0067; E05B 41/00; E05B 47/026
USPC .................................................... 340/539.11
See application file for complete search history.

(56) References Cited

U.S. PATENT DOCUMENTS

| | | | | |
|---|---|---|---|---|
| 7,193,644 | B2 | 3/2007 | Carter | |
| 7,956,739 | B2 | 6/2011 | Hong et al. | |
| 8,139,095 | B2 | 3/2012 | Carter | |
| 8,144,183 | B2 | 3/2012 | Carter | |
| 8,144,184 | B2 | 3/2012 | Carter | |
| 8,154,581 | B2 | 4/2012 | Carter | |
| 8,164,614 | B2 | 4/2012 | Carter | |
| 9,414,030 | B2 | 8/2016 | Carter | |
| 9,432,638 | B2 | 8/2016 | Carter | |
| 9,485,478 | B2 | 11/2016 | Carter | |
| 9,516,284 | B2 | 12/2016 | Carter | |
| 9,648,290 | B2 | 5/2017 | Carter | |
| 9,653,323 | B2 | 5/2017 | Chew et al. | |
| 10,674,120 | B2 | 6/2020 | Carter | |
| 10,683,677 | B1 * | 6/2020 | Funamura | E05B 17/226 |
| 10,986,717 | B1 | 4/2021 | Fu et al. | |
| 11,195,398 | B1 | 12/2021 | Fu et al. | |
| 11,581,099 | B1 | 2/2023 | Rufo et al. | |
| 2002/0070859 | A1 | 6/2002 | Gutta et al. | |
| 2002/0086660 | A1 | 7/2002 | Sullivan et al. | |
| 2003/0117280 | A1 | 6/2003 | Prehn | |
| 2003/0118216 | A1 | 6/2003 | Goldberg | |
| 2005/0176400 | A1 | 8/2005 | Mullet et al. | |
| 2005/0281435 | A1 | 12/2005 | Aggarwal | |
| 2006/0041500 | A1 | 2/2006 | Diana et al. | |
| 2009/0048859 | A1 | 2/2009 | McCarthy et al. | |
| 2009/0299825 | A1 | 12/2009 | Olawski et al. | |
| 2009/0299854 | A1 | 12/2009 | Olawski et al. | |
| 2010/0082174 | A1 | 4/2010 | Weaver et al. | |
| 2010/0289643 | A1 | 11/2010 | Trundle et al. | |
| 2011/0054973 | A1 | 3/2011 | Deich et al. | |
| 2012/0023145 | A1 | 1/2012 | Brannon et al. | |
| 2012/0167646 | A1 * | 7/2012 | Sharma | G01N 21/25 356/399 |
| 2012/0284777 | A1 | 11/2012 | Eugenio et al. | |
| 2012/0316690 | A1 | 12/2012 | Li et al. | |
| 2013/0057405 | A1 * | 3/2013 | Seelman | G08B 29/185 340/545.1 |
| 2014/0015981 | A1 | 1/2014 | Dietl | |
| 2014/0266681 | A1 | 9/2014 | Small | |
| 2014/0278028 | A1 | 9/2014 | Nye et al. | |
| 2014/0282048 | A1 | 9/2014 | Shapiro et al. | |
| 2014/0324192 | A1 | 10/2014 | Baskaran et al. | |
| 2015/0039105 | A1 | 2/2015 | Lee et al. | |
| 2015/0088329 | A1 | 3/2015 | Thiruvengada et al. | |
| 2015/0108901 | A1 | 4/2015 | Greene et al. | |
| 2015/0199919 | A1 * | 7/2015 | Ander | G08B 7/00 340/4.12 |
| 2015/0228419 | A1 | 8/2015 | Fadell et al. | |
| 2016/0142407 | A1 | 5/2016 | Chun et al. | |
| 2016/0189496 | A1 * | 6/2016 | Modi | G08B 13/22 340/545.2 |
| 2016/0261425 | A1 | 9/2016 | Horton et al. | |
| 2016/0274230 | A1 | 9/2016 | Wu et al. | |
| 2016/0350654 | A1 | 12/2016 | Lee et al. | |
| 2017/0186256 | A1 * | 6/2017 | Dumas | H04B 17/318 |
| 2017/0262706 | A1 | 9/2017 | Sun et al. | |
| 2018/0035901 | A1 | 2/2018 | Cronin et al. | |
| 2018/0047274 | A1 | 2/2018 | Miwa | |
| 2018/0114420 | A1 | 4/2018 | Siminoff et al. | |
| 2018/0165933 | A1 | 6/2018 | Siminoff | |
| 2018/0189913 | A1 | 7/2018 | Knopp et al. | |
| 2018/0240454 | A1 | 8/2018 | Raj et al. | |
| 2018/0294047 | A1 | 10/2018 | Hosseini et al. | |
| 2018/0340352 | A1 * | 11/2018 | Compton | E05B 47/0046 |
| 2018/0341835 | A1 | 11/2018 | Siminoff | |
| 2019/0087646 | A1 | 3/2019 | Goulden et al. | |
| 2019/0108404 | A1 | 4/2019 | Xu | |
| 2019/0156601 | A1 | 5/2019 | Sinha et al. | |
| 2019/0327448 | A1 | 10/2019 | Fu et al. | |
| 2020/0180506 | A1 | 6/2020 | Nakayama et al. | |
| 2021/0056184 | A1 | 2/2021 | Modani et al. | |
| 2022/0165036 | A1 | 5/2022 | Daley et al. | |

OTHER PUBLICATIONS

Unboxing the Ring Video Dorrbell is it Worth it video.

* cited by examiner

LOCK SYSTEM WITH INTEGRATED SENSORS FOR TRANSLATABLE STRUCTURE

RELATED APPLICATIONS

This application claims priority to U.S. Provisional Application having Ser. No. 63/482,568 filed on Jan. 31, 2023, the contents of which are hereby incorporated by reference in their entirety.

TECHNICAL FIELD

The current disclosure generally relates to smart home security systems. More specifically, the current disclosure relates to operational control of a lock of a security system.

BACKGROUND

Locks for sliding doors are typically either integrated with the door or are compatible with only a single brand and/or type of sliding door. Integrated latch-type sliding door locks can be security risks and are difficult or impossible to automate. Some users resort to placing a dowel or other bar in the track of a sliding door to increase the security. Sliding windows can have similar problems.

SUMMARY

One embodiment of a lock system may include a stationary mount configured to be coupled to a first surface located at a wall. The wall may define an opening in which a translatable structure is positioned and configured to translate between an open position and a closed position to permit access to a space when in the open position. The stationary mount may include an engagement feature. A lock device may be configured to be coupled to a second surface located at the wall and proximate the first surface, the lock device including a locking mechanism configured to engage with the engagement feature of the stationary mount to inhibit the translatable structure from translating between the open position and the closed position. A sensor may be configured to sense relative position of the locking mechanism relative to the engagement feature. Electronics may be configured to determine whether the lock device is in a locked state or an unlocked state. A communications interface may be configured to communicate signals remotely from the lock device. A controller may be in communication with the communications interface. A controller may be configured to actuate the locking mechanism of the lock device to switch between the locked state and the unlocked state to engage and disengage with the engagement feature of the stationary mount in response to (i) receiving a signal to cause the controller to actuate the locking mechanism and (ii) the sensor sensing that the locking mechanism and the engagement feature are engageably aligned.

One embodiment of a method of controlling a lock system of a translatable structure may include automatically determining whether a lock device is in a locked state or an unlocked state. The lock device may be configured with the translatable structure so as to inhibit translatable motion of the translatable structure when in a locked state and to enable translatable motion of the translatable structure when in an unlocked state. The lock device being in the locked state when a locking mechanism of the lock device is engaged with an engagement feature of a stationary mount. In response to receiving a command signal to transition the lock device between the unlocked state to the locked state while the lock device is in the unlocked state, an automatic determination as to whether the locking mechanism of the lock device and the engagement feature of the stationary mount are engageably aligned with one another. In response to determining that the locking mechanism and the engagement feature are engageably aligned, the locking mechanism may be actuated to engage with the engagement feature.

One embodiment of a lock system may include a lock device configured to be coupled to a surface located at a wall that defines an opening in which a translatable structure is positioned. The translatable structure may be configured to translate between an open position and a closed position and to permit access to a space when in the open position. The lock device may include a housing configured to be coupled to the surface. A locking mechanism may be configured to be rotatable relative to the housing and to engage with the translatable structure to inhibit translation thereof between the open position and the closed position. A sensor may be configured to sense relative position of the locking mechanism relative to the translatable structure. Electronics may be configured to determine whether the lock device is in a locked state or an unlocked state. A communications interface configured to communicate signals. A controller may be in communication with the communications interface, the controller configured to actuate the locking mechanism of the lock device to transition between the locked state and the unlocked state to inhibit and permit translation of the translatable structure if (i) the translatable structure is determined to be in a position that permits the locking mechanism to rotate from the unlocked state to the locked state and (ii) a determination is made that the locking mechanism is in the unlocked state.

One embodiment of a method of controlling a lock system of a translatable structure may include sensing a relative position of a locking mechanism of a lock device relative to a translatable structure that is translatable between an open position and a closed position. An automatic determination as to whether the translatable structure is in a position that permits the locking mechanism to rotate from the unlocked state to the locked state. In response to receiving a command signal, the locking mechanism of the lock device may be rotated to transition between the unlocked state and the locked state, thereby (i) inhibiting translation of the translatable structure in a first direction and (ii) enabling translation of the translatable structure in a second direction.

One embodiment of an electronic device may include a user interface configured to display information. One or more memory devices storing instructions thereon, that, when executed by one or more processors, may cause the processor(s) to receive information associated with a relative position of a locking mechanism of a lock device relative to an engagement feature of a mount, wherein the mount is coupled to a first surface located at a wall defining an opening in which a translatable structure is positioned. The translatable structure may be configured to translate between an open position and a closed position and permit access to a space when in the open position. The lock device may be coupled to a second surface located at the wall a proximate to the first surface. The lock device may further include a locking mechanism configured to engage with the engagement feature of the mount to inhibit the translatable structure from translating between the open position and the closed position. A determination as to whether the lock device is in a locked state or an unlocked state. A determination as to whether the locking mechanism and the engagement feature are engageably aligned with one another. An actuation signal may be generated to actuate the locking mechanism of the lock device between the locked state and the unlocked state to engage and disengage the locking mechanism with the engagement feature of the mount if a determination is made that the locking mechanism and the engagement feature are engageably aligned. The actuation signal may be communicated to the lock device to cause the locking mechanism to engage with the engagement feature.

One embodiment of a method of operating an electronic device may include receiving an input indicative of a state of a lock device configured to be coupled to a translatable structure. Information associated with a relative position of a locking mechanism of the lock device relative to an engagement feature of a mount may be received. The mount may be configured to be coupled to a surface at a wall defining an opening in which a translatable structure is configured to translate between an open position and a closed position and permit access to a space when in the open position. The locking mechanism may be configured to engage with the engagement feature of the mount to inhibit the translatable structure from translating between the open position and the closed position. A determination as to whether the lock device is in a locked state or an unlocked state. A determination as to whether the locking mechanism and the engagement feature are engageably aligned with one another. An actuation signal may be generated to actuate the locking mechanism of the lock device between the locked state and the unlocked state. The actuation signal may be communicated to actuate the locking mechanism to the state indicated by the input if a determination is made that the locking mechanism and the engagement feature are engageably aligned.

BRIEF DESCRIPTION OF THE FIGURES

The accompanying drawings constitute a part of this specification, illustrate an embodiment, and, together with the specification, explain the subject matter of the disclosure.

DETAILED DESCRIPTION

Before turning to the figures, which illustrate certain illustrative embodiments in detail, it should be understood that the present disclosure is not limited to the details or methodology set forth in the description or illustrated in the figures. It should also be understood that the terminology used herein is for the purpose of description only and should not be regarded as limiting.

Figure 1:
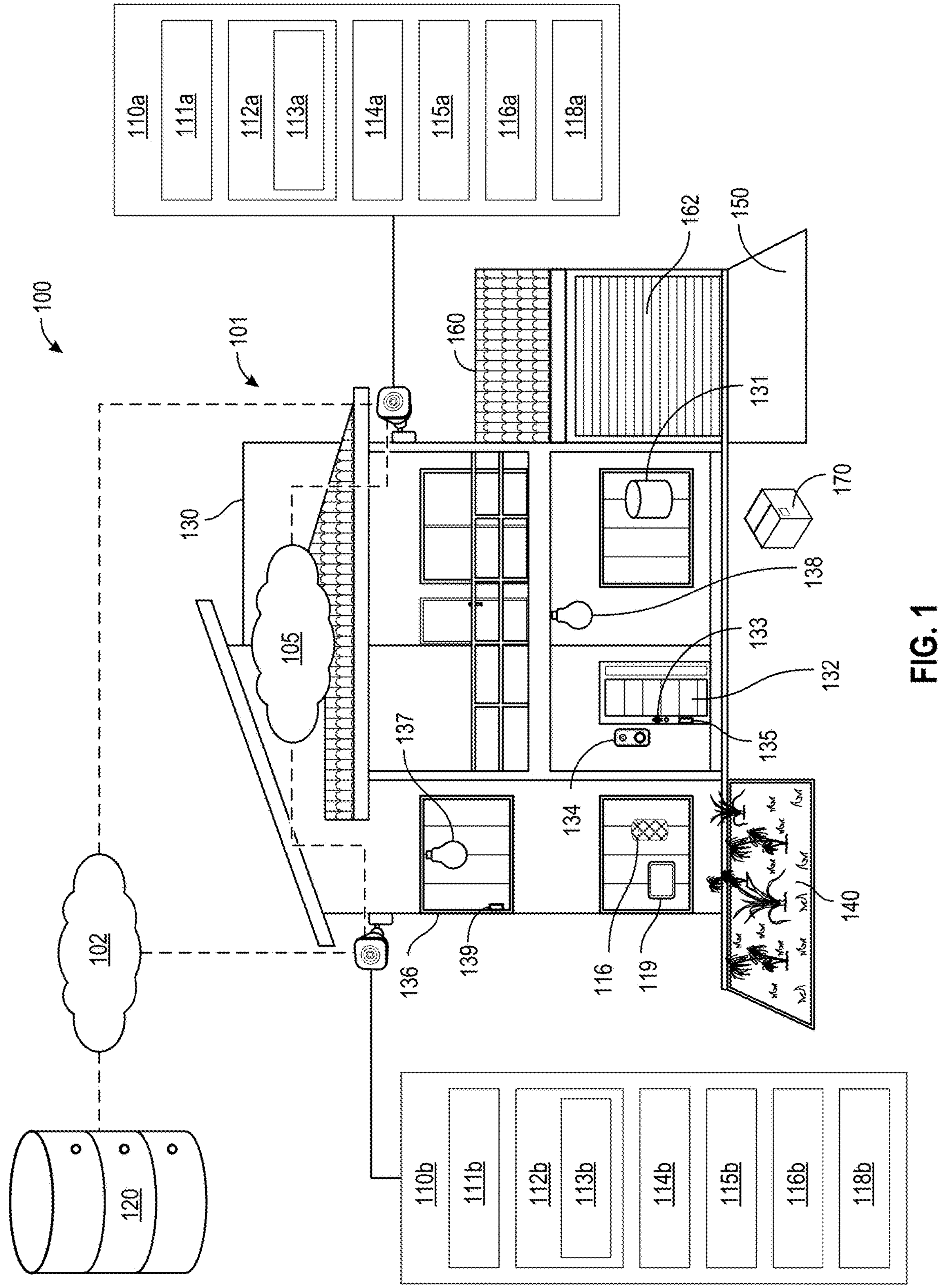
FIG. 1 is a perspective view illustrating one embodiment of a security system including smart locks configured to be utilized with sliding doors and windows, according to an embodiment.

FIG. 1 illustrates an example environment 100, such as a residential property, in which the present systems and methods may be implemented. The environment 100 may include a site that can include one or more structures, any of which can be a structure or building 130, such as a home, office, warehouse, garage, and/or the like. The building 130 may include various entryways, such as one or more doors 132, one or more windows 136, and/or a garage 160 having a garage door 162. The environment 100 may include multiple sites. In some embodiments, the environment 100 includes multiple sites, each corresponding to a different property and/or building. For example, the environment 100 may be a cul-de-sac that includes multiple buildings 130.

The building 130 may include a security system 101 or one or more security devices that are configured to detect and mitigate crime and property theft and damage by alerting a trespasser or intruder that their presence is known while optionally alerting a monitoring service about detecting a trespasser or intruder (e.g., burglar). The security system 101 may include a variety of hardware components and software modules or programs configured to monitor and protect the environment 100 and one or more buildings 130 located thereat. In some embodiments, the security system 101 includes one or more sensors (e.g., cameras, microphones, vibration sensors, pressure sensors, motion detectors, proximity sensors (e.g., door or window sensors), range sensors, etc.), lights, speakers, and optionally one or more controllers (e.g., a hub, an application executed on a user device) at the building 130 in which the security system 101 is installed. In some embodiments, the cameras, sensors, lights, speakers, and/or other devices may be smart by including one or more processors therewith to be able to process sensed information (e.g., images, sounds, motion, etc.) so that decisions may be made by the processor(s) as to whether the captured information is associated with a security risk or otherwise.

The sensor(s) of the security system 101 may be used to detect a presence of a trespasser or intruder of the environment (e.g., outside, inside, above, or below the environment) such that the sensor(s) may automatically send a communication to the controller(s). The communication may occur whether or not the security system 101 is armed, but if armed, the controller(s) may initiate a different action than if not armed. For example, if the security system 101 is not armed when an entity is detected, then the controller(s) may simply record that a detection of an entity occurred without sending a communication to a monitoring service or taking local action (e.g., outputting an alert or other alarm audio signal) and optionally notify a user via a mobile app or other communication method of the detection of the entity. If the security system 101 is armed when a detection of an entity is made, then the controller(s) may initiate a disarm countdown timer (e.g., 60 seconds) to enable a user to disarm the security system 101 via a controller, mobile app, or otherwise, and, in response to the security system 101 not being disarmed (or being accepted by a user prior to completion of the countdown timer), communicate a notification including detection information (e.g., image, sensor type, sensor location, etc.) to a monitoring service (optionally after giving a user a chance to disarm the security system 101), which may, in turn, notify public authorities, such as police, to dispatch a unit to the environment 100, initiate an alarm (e.g., output an audible signal, illuminate the lights) local to the environment 100, communicate a message to a user via a mobile app or other communication (e.g., text message), or otherwise.

In the event that the security system 101 is armed and detects a trespasser or intruder, the security system 101 may be configured to generate and communicate a message to a monitoring service of the security system 101. The monitoring service may be a third-party monitoring service (i.e., a service that is not the provider of the security system 101). The message may include a one or more parameters, such as location of the environment 100, type of sensor, location of the sensor, image(s) if received, and any other information received with the message. It should be understood that the message may utilize any communications protocol for communicating information from the security service to the monitoring service. The message and data contained therein may be used to populate a template on a user interface of the monitoring service such that an operator at the monitoring service may view the data to assess a situation. In some embodiments, a user of the security system 101 may be able to provide additional information that may also be populated on the user interface for an operator in determining whether to contact the authorities to initiate a dispatch. The monitoring service may utilize a standard procedure in response to receiving the message in communicating with a user of the security service and/or dispatching the authorities.

A first camera 110*a* and a second camera 110*b*, referred to herein collectively as cameras 110, may be disposed at the environment 100, such as outside and/or inside the building 130. The cameras 110 may be attached to the building 130, such as at a front door of the building 130 or inside of a living room. The cameras 110 may communicate with each other over a local network 105. The cameras 110 may communicate with a server 120 over a network 102. The local network 105 and/or the network 102, in some embodiments, may each include a digital communication network that transmits digital communications. The local network 105 and/or the network 102 may each include a wireless network, such as a wireless cellular network, a local wireless network, such as a Wi-Fi network, a Bluetooth® network, a near-field communication ("NFC") network, an ad hoc network, and/or the like. The local network 105 and/or the network 102 may each include a wide area network ("WAN"), a storage area network ("SAN"), a local area network ("LAN") (e.g., a home network), an optical fiber network, the internet, or other digital communication network. The local network 105 and/or the network 102 may each include two or more networks. The network 102 may include one or more servers, routers, switches, and/or other networking equipment. The local network 105 and/or the network 102 may also include one or more computer readable storage media, such as a hard disk drive, an optical drive, non-volatile memory, RAM, or the like.

The local network 105 and/or the network 102 may be a mobile telephone network. The local network 105 and/or the network 102 may employ a Wi-Fi network based on any one of the Institute of Electrical and Electronics Engineers ("IEEE") 802.11 standards. The local network 105 and/or the network 102 may employ Bluetooth® connectivity and may include one or more Bluetooth connections. The local network 105 and/or the network 102 may employ Radio Frequency Identification ("RFID") communications, including RFID standards established by the International Organization for Standardization ("ISO"), the International Electrotechnical Commission ("IEC"), the American Society for Testing and Materials® (ASTM®), the DASH7™ Alliance, and/or EPCGlobal™.

In some embodiments, the local network 105 and/or the network 102 may employ ZigBee® connectivity based on the IEEE 802 standard and may include one or more ZigBee® connections. The local network 105 and/or the network 102 may include a ZigBee® bridge. In some embodiments, the local network 105 and/or the network 102 employs Z-Wave® connectivity as designed by Sigma Designs® and may include one or more Z-Wave connections. The local network 105 and/or the network 102 may employ an ANT® and/or ANT+® connectivity as defined by Dynastream® Innovations Inc. of Cochrane, Canada and may include one or more ANT connections and/or ANT+ connections.

The first camera 110*a* may include a processor 111*a*, a memory 112*a*, a radar sensor 114*a*, an image sensor 115*a*, a speaker 116*a*, and a microphone 118*a*. The memory 112*a* may include computer-readable, non-transitory instructions which, when executed by the processor 111*a*, cause the processor 111*a* to perform methods and operations discussed herein. The processor 111*a* may include one or more processors. The second camera 110*b* may include an image sensor 115*b*, a processor 111*b*, a memory 112*b*, a radar sensor 114*b*, a speaker 116*b*, and a microphone 118*b*. The memory 112*b* may include computer-readable, non-transitory instructions which, when executed by the processor 111*b*, cause the processor to perform methods and operations discussed herein. The processor 111*a* may include one or more processors.

The memory 112*a* may include an AI model 113*a*. The AI model 113*a* may be applied to or otherwise process data from the camera 110*a*, the radar sensor 114*a*, and/or the microphone 118*a* to detect and/or identify one or more objects (e.g., people, animals, vehicles, shipping packages or other deliveries, or the like), one or more events (e.g., arrivals, departures, weather conditions, crimes, property damage, or the like), and/or other conditions. For example, the cameras 110 may determine a likelihood that an object 170, such as a package, vehicle, person, or animal, is within an area (e.g., a geographic area, a property, a room, a field of view of the first camera 110*a*, a field of view of the second camera 110*b*, a field of view of another sensor, or the like) based on data from the first camera 110*a*, the second camera 110*b*, and/or other sensors.

The memory 112*b* of the second camera 110*b* may include an AI model 113*b*. The AI model 113*b* may be similar to the AI model 113*a*. In some embodiments, the AI model 113*a* and the AI model 113*b* have the same parameters. In some embodiments, the AI model 113*a* and the AI model 113*b* are trained together using data from the cameras 110. In some embodiments, the AI model 113*a* and the AI model 113*b* are initially the same, but are independently trained by the first camera 110*a* and the second camera 110*b*, respectively. For example, the first camera 110*a* may be focused on a porch and the second camera 110*b* may be focused on a driveway, causing data collected by the first camera 110*a* and the second camera 110*b* to be different, leading to different training inputs for the first AI model 113*a* and the second AI model 113*b*. In some embodiments, the AI models 113 are trained using data from the server 120. For example, the AI models 113 are trained using data collected from a plurality of cameras associated with a plurality of buildings. The cameras 110 may share data with the server 120 for training the AI models 113 and/or a plurality of other AI models. The AI models 113 may be trained using both data from the server 120 and data from their respective cameras (e.g., the first camera 110*a* and the second camera 110*b*).

The cameras 110, in some embodiments, may determine a likelihood that the object 170 (e.g., a package) is within an area (e.g., a portion of a site or of the environment 100) based at least in part on audio data from microphones 118, using sound analytics and/or the AI models 113. In some embodiments, the cameras 110 may determine a likelihood that the object 170 is within an area based at least in part on image data using image processing, image detection, and/or the AI models 113. The cameras 110 may determine a likelihood that an object is within an area based at least in part on depth data from the radar sensors 114, a direct or indirect time of flight sensor, an infrared sensor, a structured light sensor, and/or any other sensor. For example, the cameras 110 may determine a location for an object, a speed of an object, a proximity of an object to another object and/or location, an interaction of an object (e.g., touching and/or approaching another object or location, touching a car/automobile or other vehicle, touching or opening a mailbox, leaving a package, leaving a car door open, leaving a car running, touching a package, picking up a package, or the like), and/or another determination based at least in part on depth data from the radar sensors 114.

The sensors, such as cameras 110, radar sensors 114, microphones 118, door sensors, window sensors, or other sensors, may be configured to detect a breach of security event for which the respective sensors are configured. For example, the microphones 118 may be configured to sense sounds, such as voices, broken glass, door knocking, or otherwise, and an audio processing system may be configured to process the audio so as to determine whether the captured audio signals are indicative of a trespasser or potential intruder of the environment 100 or building 130. Each of the signals generated or captured by the different sensors may be processed so as to determine whether the sounds are indicative of a security risk or not, and the determination may be time and/or situation dependent. For example, responses to sounds made when the security system 101 is armed may be different to responses to sounds when the security system 101 is unarmed.

A user interface 119 may be installed or otherwise located at the building 130. The user interface 119 may be part of or executed by a device, such as a mobile phone, a tablet, a laptop, wall panel, or other device. The user interface 119 may connect to the cameras 110 via the network 102 or the local network 105. The user interface 119 may allow a user to access sensor data of the cameras 110. For example, the user interface 119 may allow the user to view a field of view of the image sensors 115 and hear audio data from the microphones 118. In an example, the user interface may allow the user to view a representation, such as a point cloud, or radar data from the radar sensors 114.

The user interface 119 may facilitate a user to provide input to the cameras 110. For example, the user interface 119 may facilitate a user to speak or otherwise provide sounds using the speakers 116. By way of another example, the user interface 119 may facilitate a user to move the cameras 110 to change the field of view of the cameras 110.

In some embodiments, the cameras 110 may receive additional data from one or more additional sensors, such as a door sensor 135 of the door 132, an electronic lock 133 of the door 132, a doorbell camera 134, and/or a window sensor 139 of the window 136. The door sensor 135, the electronic lock 133, the doorbell camera 134, and/or the window sensor 139 may be connected to the local network 105 and/or the network 102. The cameras 110 may receive the additional data from the door sensor 135, the electronic lock 133, the doorbell camera 134, and/or the window sensor 139 from the server 120.

In some embodiments, the cameras 110 may determine separate and/or independent likelihoods that an object is within an area based on data from different sensors (e.g., processing data separately, using separate machine learning and/or other artificial intelligence, using separate metrics, or the like). The cameras 110 may combine data, likelihoods, determinations, or the like from multiple sensors such as image sensors 115, the radar sensors 114, and/or the microphones 118 into a single determination of whether an object is within an area (e.g., in order to perform an action relative to the object 170 within the area. For example, the cameras 110 and/or each of the cameras 110 may use a voting algorithm and determine that the object 170 is present within an area in response to a majority of sensors of the cameras 110 and/or of each of the cameras 110 determining that the object 170 is present within the area. In some embodiments, the cameras 110 may determine that the object 170 is present within an area in response to all sensors determining that the object 170 is present within the area (e.g., a more conservative and/or less aggressive determination than a voting algorithm). In some embodiments, the cameras 110 may determine that the object 170 is present within an area in response to at least one sensor determining that the object 170 is present within the area (e.g., a less conservative and/or more aggressive determination than a voting algorithm).

The cameras 110, in some embodiments, may combine confidence metrics indicating likelihoods that the object 170 is within an area from multiple sensors of the cameras 110 and/or additional sensors (e.g., averaging confidence metrics, selecting a median confidence metric, or the like) in order to determine whether the combination indicates a presence of the object 170 within the area. In some embodiments, the cameras 110 are configured to correlate and/or analyze data from multiple sensors together. For example, the cameras 110 may detect a person or other object in a specific area and/or field of view of the image sensors 115 and may confirm a presence of the person or other object using data from additional sensors of the cameras 110 such as the radar sensors 114 and/or the microphones 118, confirming a sound made by the person or other object, a distance and/or speed of the person or other object, or the like. The cameras 110, in some embodiments, may detect the object 170 with one sensor and identify and/or confirm an identity of the object 170 using a different sensor. In an example, the cameras 110 detect the object 170 using the image sensor 115*a* of the first camera 110*a* and verifies the object 170 using the radar sensor 114*b* of the second camera 110*b*. In this manner, in some embodiments, the cameras 110 may detect and/or identify the object 170 more accurately using multiple sensors than may be possible using data from a single sensor.

The cameras 110, in some embodiments, in response to determining that a combination of data and/or determinations from the multiple sensors indicates a presence of the object 170 within an area, may perform initiate, or otherwise coordinate one or more actions relative to the object 170 within the area. For example, the cameras 110 may perform an action including emitting one or more sounds from the speakers 116, turning on a light, turning off a light, directing a lighting element toward the object 170, opening or closing the garage door 162, turning a sprinkler on or off, turning a television or other smart device or appliance on or off, activating a smart vacuum cleaner, activating a smart lawnmower, and/or performing another action based on a detected object, based on a determined identity of a detected object, or the like. In an example, the cameras 110 may actuate an interior light 137 of the building 130 and/or an exterior light 138 of the building 130. The interior light 137 and/or the exterior light 138 may be connected to the local network 105 and/or the network 102.

In some embodiments, the security system 101 and/or security device may perform initiate, or otherwise coordinate an action selected to deter a detected person (e.g., to deter the person from the area and/or property, to deter the person from damaging property and/or committing a crime, or the like), to deter an animal, or the like. For example, based on a setting and/or mode, in response to failing to identify an identity of a person (e.g., an unknown person, an identity failing to match a profile of an occupant or known user in a library, based on facial recognition, based on bio-identification, or the like), and/or in response to determining a person is engaged in suspicious behavior and/or has performed a suspicious action, or the like, the cameras 110 may perform, initiate, or otherwise coordinate an action to deter the detected person. In some embodiments, the cameras 110 may determine that a combination of data and/or determinations from multiple sensors indicates that the detected human is, has, intends to, and/or may otherwise perform one or more suspicious acts, from a set of predefined suspicious acts or the like, such as crawling on the ground, creeping, running away, picking up a package, touching an automobile and/or other vehicle, opening a door of an automobile and/or other vehicle, looking into a window of an automobile and/or other vehicle, opening a mailbox, opening a door, opening a window, throwing an object, or the like.

In some embodiments, the cameras 110 may monitor one or more objects based on a combination of data and/or determinations from the multiple sensors. For example, in some embodiments, the cameras 110 may detect and/or determine that a detected human has picked up the object 170 (e.g., a package, a bicycle, a mobile phone or other electronic device, or the like) and is walking or otherwise moving away from the home or other building 130. In a further embodiment, the cameras 110 may monitor a vehicle, such as an automobile, a boat, a bicycle, a motorcycle, an offroad and/or utility vehicle, a recreational vehicle, or the like. The cameras 110, in various embodiments, may determine if a vehicle has been left running, if a door has been left open, when a vehicle arrives and/or leaves, or the like.

The environment 100 may include one or more regions of interest, which each may be a given area within the environment. A region of interest may include the entire environment 100, an entire site within the environment, or an area within the environment. A region of interest may be within a single site or multiple sites. A region of interest may be inside of another region of interest. In an example, a property-scale region of interest which encompasses an entire property within the environment 100 may include multiple additional regions of interest within the property.

The environment 100 may include a first region of interest 140 and/or a second region of interest 150. The first region of interest 140 and the second region of interest 150 may be determined by the AI models 113, fields of view of the image sensors 115 of the cameras 110, fields of view of the radar sensors 114, and/or user input received via the user interface 119. For example, the first region of interest 140 includes a garden or other landscaping of the building 130 and the second region of interest 150 includes a driveway of the building 130. In some embodiments, the first region of interest 140 may be determined by user input received via the user interface 119 indicating that the garden should be a region of interest and the AI models 113 determining where in the fields of view of the sensors of the cameras 110 the garden is located. In some embodiments, the first region of interest 140 may be determined by user input selecting, within the fields of view of the sensors of the cameras 110 on the user interface 119, where the garden is located. Similarly, the second region of interest 150 may be determined by user input indicating, on the user interface 119, that the driveway should be a region of interest and the AI models 113 determining where in the fields of view of the sensors of the cameras 110 the driveway is located. In some embodiments, the second region of interest 150 may be determined by user input selecting, on the user interface 119, within the fields of view of the sensors of the cameras 110, where the driveway is located.

In response to determining that a combination of data and/or determinations from the multiple sensors indicates that a detected human (e.g., an entity) is, has, intends to, and/or may otherwise perform one or more suspicious acts, is unknown/unrecognized, has entered a restricted area/zone such as the first region of interest 140 or the second region of interest 150, the security system 101 and/or security devices may expedite/initiate a deter action, reduce a waiting/monitoring period after detecting the human and before performing a deter action, or the like. In response to determining that a combination of data and/or determinations from the multiple sensors indicates that a detected human is continuing and/or persisting performance of one or more suspicious acts, the cameras 110 may escalate one or more deter actions, perform one or more additional deter actions (e.g., a more serious deter action), or the like. For example, the cameras 110 may play an escalated and/or more serious sound such as a siren, yelling, or the like; may turn on a spotlight, strobe light, or the like; and/or may perform, initiate, or otherwise coordinate another escalated and/or more serious action. In some embodiments, the cameras 110 may enter a different state (e.g., an armed mode, a security mode, an away mode, or the like) in response to detecting a human in a predefined restricted area/zone or other region of interest, or the like (e.g., passing through a gate and/or door, entering an area/zone previously identified by an authorized user as restricted, entering an area/zone not frequently entered such as a flowerbed, shed or other storage area, or the like).

In some embodiments, the cameras 110 may perform, initiate, or otherwise coordinate, a welcoming action, and/or another predefined action in response to recognizing a known human (e.g., an identity matching a profile of an occupant or known user in a library, based on facial recognition, based on bio-identification, or the like) such as executing a configurable scene for a user, activating lighting, playing music, opening or closing a window covering, turning a fan on or off, locking or unlocking a door 132, lighting a fireplace, powering an electrical outlet, turning on or play a predefined channel or video or music on a television or other device, starting or stopping a kitchen appliance, starting or stopping a sprinkler system, opening or closing the garage door 162, adjusting a temperature or other function of a thermostat or furnace or air conditioning unit, or the like. In response to detecting a presence of a known human, one or more safe behaviors and/or conditions, or the like, in some embodiments, the cameras 110 may extend, increase, pause, toll, and/or otherwise adjust a waiting/monitoring period after detecting a human, before performing a deter action, or the like.

In some embodiments, the cameras 110 may receive a notification from a user's smart phone that the user is within a predefined proximity or distance from the home, e.g., on their way home from work. Accordingly, the cameras 110 may activate a predefined or learned comfort setting for the home, including setting a thermostat at a certain temperature, turning on certain lights inside the home, turning on certain lights on the exterior of the home, turning on the television, turning a water heater on, and/or the like.

The cameras 110, in some embodiments, may be configured to detect one or more health events based on data from one or more sensors. For example, the cameras 110 may use data from the radar sensors 114 to determine a heartrate, a breathing pattern, or the like and/or to detect a sudden loss of a heartbeat, breathing, or other change in a life sign. The cameras 110 may detect that a human has fallen and/or that another accident has occurred.

In some embodiments, the security system 101 and/or one or more security devices may include one or more speakers 116. The speakers 116 may be independent from other devices or integrated therein. For example, the cameras 110 may include one or more speakers 116 (e.g. speakers 116*a*, 116*b*) that enable sound to be output therefrom. In some embodiments, a controller (e.g., controller 106) or other device may include a speaker from which sound (e.g., alarm sound, tones, verbal audio, and/or otherwise) may be output. The controller 106 may be configured to cause audio sounds (e.g., verbal commands, dog barks, alarm sounds, etc.) to play and/or otherwise emit those audio sounds from the speakers 116 located at the building 130. In some embodiments, one or more sounds may be output in response to detecting the presence of a human within an area. For example, the controller 106 may cause the speakers 116 to play one or more sounds selected to deter a detected person from an area around a building 130, environment 100, and/or object. The speakers 116, in some embodiments, may vary sounds over time, dynamically layer and/or overlap sounds, and/or generate unique sounds, to preserve a deterrent effect of the sounds over time and/or to avoid, limit, or even prevent those being deterred from becoming accustomed to the same sounds used over and over.

The security system 101, one or more security devices, and/or the speakers 116, in some embodiments, may be configured to store and/or has access to a library comprising a plurality of different sounds and/or a set of dynamically generated sounds so that the controller 106 may vary the different sounds over time, thereby not using the same sound too often. In some embodiments, varying and/or layering sounds allows a deter sound to be more realistic and/or less predictable.

One or more of the sounds may be selected to give a perception of human presence in the environment 100 or building 130, a perception of a human talking over an electronic speaker 116 in real-time, or the like which may be effective at preventing crime and/or property damage. For example, a library and/or other set of sounds may include audio recordings and/or dynamically generated sounds of one or more, male and/or female voices saying different phrases, such as for example, a female saying "hello?," a female and male together saying "can we help you?," a male with a gruff voice saying, "get off my property" and then a female saying "what's going on?," a female with a country accent saying "hello there," a dog barking, a teenager saying "don't you know you're on camera?," and/or a man shouting "hey!" or "hey you!," or the like.

In some embodiments, the security system 101, one or more security devices, and/or the speakers 116 may dynamically generate one or more sounds (e.g., using machine learning and/or other artificial intelligence, or the like) with one or more attributes that vary from a previously played sound. For example, the security system 101, one or more security devices, and/or the speakers 116 may generate sounds with different verbal tones, verbal emotions, verbal emphases, verbal pitches, verbal cadences, verbal accents, or the like so that the sounds are said in different ways, even if they include some or all of the same words. In some embodiments, the security system 101, one or more security devices, the speakers 116 and/or a remote computer 125 may train machine learning on reactions of previously detected humans in other areas to different sounds and/or sound combinations (e.g., improving sound selection and/or generation over time).

The security system 101, one or more security devices, and/or the speakers 116 may combine and/or layer these sounds (e.g., primary sounds), with one or more secondary, tertiary, and/or other background sounds, which may comprise background noises selected to give an appearance that a primary sound is a person speaking in real time, or the like. For example, a secondary, tertiary, and/or other background sound may include sounds of a kitchen, of tools being used, of someone working in a garage, of children playing, of a television being on, of music playing, of a dog barking, or the like. The security system 101, one or more security devices, and/or the speakers 116, in some embodiments, may be configured to combine and/or layer one or more tertiary sounds with primary and/or secondary sounds for more variety, or the like. For example, a first sound (e.g., a primary sound) may comprise a verbal language message and a second sound (e.g., a secondary and/or tertiary sound) may comprise a background noise for the verbal language message (e.g., selected to provide a real-time temporal impression for the verbal language message of the first sound, or the like).

In this manner, in various embodiments, the security system 101, one or more security devices, and/or the speakers 116 may intelligently track which sounds and/or combinations of sounds have been played, and in response to detecting the presence of a human, may select a first sound to play that is different than a previously played sound, may select a second sound to play that is different than the first sound, and may play the first and second sounds at least partially simultaneously and/or overlapping. For example, the security system 101, one or more security devices, and/or the speakers 116 may play a primary sound layered and/or overlapping with one or more secondary, tertiary, and/or background sounds, varying the sounds and/or the combination from one or more previously played sounds and/or combinations, or the like.

The security system 101, one or more security devices, and/or the speakers 116, in some embodiments, may select and/or customize an action based at least partially on one or more characteristics of a detected object. For example, the cameras 110 may determine one or more characteristics of the object 170 based on audio data, image data, depth data, and/or other data from a sensor. For example, the cameras 110 may determine a characteristic such as a type or color of an article of clothing being worn by a person, a physical characteristic of a person, an item being held by a person, or the like. The cameras 110 may customize an action based on a determined characteristic, such as by including a description of the characteristic in an emitted sound (e.g., "hey you in the blue coat!", "you with the umbrella!", or another description), or the like.

The security system 101, one or more security devices, and/or the speakers 116, in some embodiments, may escalate and/or otherwise adjust an action over time and/or may perform a subsequent action in response to determining (e.g., based on data and/or determinations from one or more sensors, from the multiple sensors, or the like) that the object 170 (e.g., a human, an animal, vehicle, drone, etc.) remains in an area after performing a first action (e.g., after expiration of a timer, or the like). For example, the security system 101, one or more security devices, and/or the speakers 116 may increase a volume of a sound, emit a louder and/or more aggressive sound (e.g., a siren, a warning message, an angry or yelling voice, or the like), increase a brightness of a light, introduce a strobe pattern to a light, and/or otherwise escalate an action and/or subsequent action. In some embodiments, the security system 101, one or more security devices, and/or the speakers 116 may perform a subsequent action (e.g., an escalated and/or adjusted action) relative to the object 170 in response to determining that movement of the object 170 satisfies a movement threshold based on subsequent depth data from the radar sensors 114 (e.g., subsequent depth data indicating the object 170 is moving and/or has moved at least a movement threshold amount closer to the radar sensors 114, closer to the building 130, closer to another identified and/or predefined object, or the like).

In some embodiments, the cameras 110 and/or the server 120 (or other device), may include image processing capabilities and/or radar data processing capabilities for analyzing images, videos, and/or radar data that are captured with the cameras 110. The image/radar processing capabilities may include object detection, facial recognition, gait detection, and/or the like. For example, the controller 106 may analyze or process images and/or radar data to determine that a package is being delivered at the front door/porch. In other examples, the cameras 110 may analyze or process images and/or radar data to detect a child walking within a proximity of a pool, to detect a person within a proximity of a vehicle, to detect a mail delivery person, to detect animals, and/or the like. In some embodiments, the cameras 110 may utilize the AI models 113 for processing and analyzing image and/or radar data.

In some embodiments, the security system 101, one or more security devices, and/or the speakers 116 are connected to various IoT devices. As used herein, an IoT device may be a device that includes computing hardware to connect to a data network and to communicate with other devices to exchange information. In such an embodiment, the cameras 110 may be configured to connect to, control (e.g., send instructions or commands), and/or share information with different IoT devices. Examples of IoT devices may include home appliances (e.g. stoves, dishwashers, washing machines, dryers, refrigerators, microwaves, ovens, coffee makers), vacuums, garage door openers, thermostats, HVAC systems, irrigation/sprinkler controller, television, set-top boxes, grills/barbeques, humidifiers, air purifiers, sound systems, phone systems, smart cars, cameras, projectors, and/or the like. In some embodiments, the cameras 110 may poll, request, receive, or the like information from the IoT devices (e.g., status information, health information, power information, and/or the like) and present the information on a display and/or via a mobile application.

The IoT devices may include a smart home device 131. The smart home device 131 may be connected to the IoT devices. The smart home device 131 may receive information from the IoT devices, configure the IoT devices, and/or control the IoT devices. In some embodiments, the smart home device 131 provides the cameras 110 with a connection to the IoT devices. In some embodiments, the cameras 110 provide the smart home device 131 with a connection to the IoT devices. The smart home device 131 may be an AMAZON ALEXA device, an AMAZON ECHO, A GOOGLE NEST device, a GOOGLE HOME device, or other smart home hub or device. In some embodiments, the smart home device 131 may receive commands, such as voice commands, and relay the commands to the cameras 110. In some embodiments, the cameras 110 may cause the smart home device 131 to emit sound and/or light, speak words, or otherwise notify a user of one or more conditions via the user interface 119.

In some embodiments, the IoT devices include various lighting components including the interior light 137, the exterior light 138, the smart home device 131, other smart light fixtures or bulbs, smart switches, and/or smart outlets. For example, the cameras 110 may be communicatively connected to the interior light 137 and/or the exterior light 138 to turn them on/off, change their settings (e.g., set timers, adjust brightness/dimmer settings, and/or adjust color settings).

In some embodiments, the IoT devices include one or more speakers within the building. The speakers may be stand-alone devices such as speakers that are part of a sound system, e.g., a home theatre system, a doorbell chime, a Bluetooth speaker, and/or the like. In some embodiments, the one or more speakers may be integrated with other devices such as televisions, lighting components, camera devices (e.g., security cameras that are configured to generate an audible noise or alert), and/or the like. In some embodiments, the speakers may be integrated in the smart home device 131.

Lock System

Figure 2:
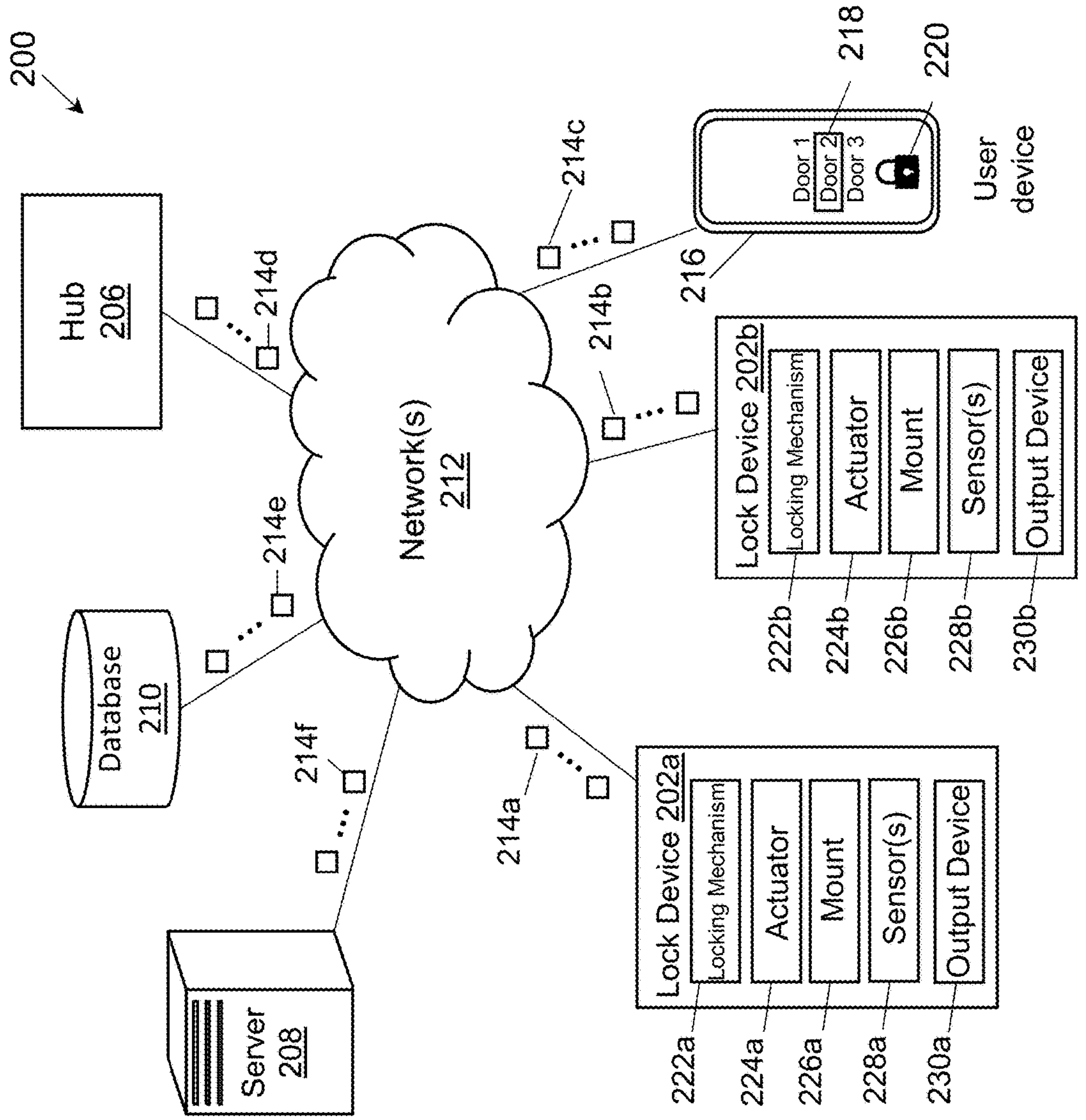
FIG. 2 is a block diagram of an illustrative lock system operating in a communications network environment, according to an embodiment.

Referring to FIG. 2, an illustrative security system 200 (e.g., a security system, a home system, a building securement system, locking devices) may include multiple communicatively coupled smart locks 202*a*-202*n* (collectively 202) for securing a space (e.g., a building, a room, a yard, a property, a shed), according to an illustrative embodiment. The system 200 may be located partially or entirely within the space. The space may be, for example, any building, edifice, or enclosure including one or more walls and one or more entrances. In the present disclosure, the building may include, but is not limited to, a home, office, store, business, courtyard, shed, etc. The system 200 within and engaged to the building may include one or more lock devices (e.g., locks, security devices, latch devices, or the like) 202*a*-202*n*, collectively referred to hereinafter as the lock devices 202, and a hub 206 located internal and/or external from the space. Although the lock devices 202 may be applicable to any type of lock, the lock devices 202 may include at least one lock device configured to be applied to a translatable structure. The system 200 may further include a server 208, a database 210, one or more networks 212 (e.g., a local network may be part of the system 200 provided by the security system 101), and/or a user device 216. The various devices and components of the system 200 may communicate with one another via the one or more networks 212. The system 200 may be used to access, view, control, and/or adjust one or more locking mechanisms included in the lock devices 202 coupled to a translatable structure (e.g., a sliding door, a sliding window, sliding gate, or the like). The translatable structure may be any structure that is translatable between an open position and a closed position (or any position therebetween) to facilitate selectively permitting access (e.g., entrance, exit) to the space. In some embodiments, the translatable structure is an exit/entrance door through which a user of the system 200 exits/enters the building. In some embodiments, the translatable structure is a sliding window of the building configured to be opened and closed. Though the term "translatable structure" is used in various terms of the present disclosure, it should be understood that any linear motion mechanism or means for entering/exiting the building may be encompassed in the term "translatable structure." For example, "translatable structure" may encompass sliding doors, windows, gates, barn doors, etc.

For case of description and understanding, FIG. 2 depicts the system 200 as having one or a small number of each component. Other embodiments may, however, include additional and/or alternative components, or omit certain components, from those of FIG. 2 and still fall within the scope of this disclosure. As an example, it may be common for embodiments to include multiple servers 208 and/or multiple databases 210 that are communicably coupled to or operated by the server 208 and the lock devices 202 through the network 212. Embodiments may include or otherwise implement any number of devices capable of performing the various features and tasks described herein. For instance, FIG. 2 depicts the database 210 as hosted as or operated as a distinct computing device from the server 208, though, in some embodiments, the server 208 may include an integrated database 210 hosted by the server 208.

The system 200 may include or utilize one or more networks 212, which may include any number of internal networks, (e.g., LANs) external networks (e.g., WANs), private networks (e.g., intranets, VPNs), and public networks (e.g., Internet). The network(s) 212 may include various hardware and software components for hosting and conducting communications amongst the components of the system 200. Moreover, non-limiting examples of such internal or external networks 212 may include a Local Area Network (LAN), Wireless Local Area Network (WLAN), Metropolitan Area Network (MAN), Wide Area Network (WAN), and the Internet. The communication over the networks 212 may be performed in accordance with various communication protocols, such as Transmission Control Protocol and Internet Protocol (TCP/IP), User Datagram Protocol (UDP), and IEEE communication protocols, among others. Additional, and/or alternative communication protocols that may be used by the network(s) 212 may include Wi-Fi, Bluetooth, Zigbee, Z-Wave, Thread, Insteon, LoRaWAN, KNK, DALI, and/or UPnP.

The server 208 may include one or more processors that execute one or more software programs to perform various processes (e.g., the method 700). The server 208 may include processor(s) and non-transitory, computer readable medium including instructions, which, when executed by the processor(s), cause the processor to perform methods disclosed herein. The processor(s) may include any number of physical, hardware processor. Although FIG. 2 shows only a single server 208, the server 208 may include any number of computing devices. In some cases, the computing devices of the server 208 may perform all or portions of the processes described herein to support the system 200. The server 208 may include computing devices (e.g., processors) operating in a distributed or cloud computing configuration and/or in a virtual machine configuration. It should also be appreciated that, in some embodiments, one or more functions of the server 208 may be partly or entirely performed by the lock devices 202 or any other component (e.g., the hub 206, the user device 216, or another component).

The hub 206 may be configured to perform functions similar to, or the same as, the controller 106 of FIG. 1, as previously described. The hub 206 may be communicatively coupled with the various components of the system 200 and/or other smart devices of the building directly or indirectly (e.g., through the network(s) 212, as shown in FIG. 2). By way of example, the hub 206 may receive control signals from, and transmit the control signals to, the lock devices 202. The hub 206 may be configured to receive various communication protocol signals and translate the various communication protocol signals into control signals to control the various components of the system 200.

The lock devices 202 may be any type of electromechanical device including one or more hardware components (e.g., actuators, locks, motors, one or more processors, memory, user interfaces, sensors, output devices, housings, mounts) and software components capable of performing the various processes and tasks described herein. Generally, the lock devices 202 are configured to transition between a locked state and an unlocked state to inhibit and permit, respectively, translation (e.g., movement, sliding) of a translatable structure, such as a door or a window. In some embodiments, the lock devices 202 may be the same or substantially similar to each other and configured to perform the same or substantially similar functions. For example, lock device 202*a* may be coupled to a wall or door frame proximate a sliding door. The wall may define an opening to the space and the door may facilitate selective access to the space. The lock device 202*a* may be configured to transition between the locked state and the unlocked state to inhibit and permit, respectively, translation of the door between a closed position and an open position. Further, the lock device 202*n* may be coupled to a wall or window frame proximate a window. The wall may define an opening to the space and the window may facilitate selective access to the space. The lock device 202*n* may be configured to transition between the locked state and the unlocked state to inhibit and permit, respectively, translation of the window between a closed position and an open position. In some embodiments, the first lock device 202*a* and the second lock device 202*n* may be configured to operate cooperatively to inhibit and permit, respectively, translation of the translatable structure between the closed position and the open position.

The lock devices 202 may include a locking mechanism (e.g., a lock, a bolt, a rotational bolt, a tapered bolt, or the like), shown as locking mechanism 222. An electromechanical or electromagnetic actuator (e.g., a DC motor, an AC motor, a stepper motor, a servo motor, a linear motor, a piezoelectric motor, a solenoid, or the like), shown as actuator 224, may be configured to actuate the locking mechanism 222 between an locked state (e.g., extended position) and an unlocked state (e.g. retracted position). A stationary mount (e.g., a bracket, an engagement feature, a locking mechanism receiver, or the like), shown as mount 226, may be configured to provide an engagement feature with which the locking mechanism 222 is configured to selectively engage with. One or more sensors (e.g., proximity sensor, motion sensor, position sensor, accelerometer, vision sensor, radar sensor, camera, force sensor, microphone, or the like), shown as sensors 228, configured to monitor operation of the lock devices 202 and the space surrounding the lock devices 202; and one or more output devices (e.g., an LED, a spotlight, a speaker, a display, or the like), shown as output device 230. By way of example, the first lock device 202*a* may include a locking mechanism 222*a*, an actuator 224*a*, a mount 226*a*, sensor(s) 228*a*, and an output device 230*a*, and the second lock device 202*b* may include a locking mechanism 222*b*, an actuator 224*b*, a mount 226*b*, sensor(s) 228*b*, and an output device 230*b*.

In some embodiments the first lock device 202*a* and the second lock device 202*b* share one or more components. For example, the first lock device 202*a* and the second lock device 202*b* may both control operation of and/or otherwise include a common mount 226, common sensors 228, and/or common output devices 230. By way of example, the lock devices 202 may operate cooperatively to inhibit and permit, respectively, translation of the same translatable structure between a closed position and an open position, and may include one or more common sensors 228 (e.g., share data from the one or more common sensors 228). By way of another example, the lock devices 202 may operate cooperatively to inhibit and permit, respectively, translation of the same translatable structure between the closed position and the open position, wherein the lock devices 202 share a common mount 226 such that the locking mechanism 222*a* of the first lock device 202*a* is configured to engage with the common mount 226 at a first location along a length (e.g., height, width) of the common mount 226 and the locking mechanism 222*b* of the second lock device 202*b* is configured to engage with the common mount 226 at a second location along the length (e.g., height, width) of the common mount 226. In some embodiments, the lock devices 202 do not include one or more of the locking mechanism 222, the actuator 224, the mount 226, the one or more sensors 228, or the one or more output devices 230.

In some embodiments, the lock devices 202 include one or more additional hardware components (e.g., a controller, processing circuitry, one or more processors, memory, communications interface, etc.) capable of receiving and transmitting one or more control signals (e.g., communication signals, sensor data signals, actuation signals, etc.) between other lock devices 202, the hub 206, the server 208, the database 210, the user device 216, and/or any other component of the system 200 over one or more frequency bands and using one or more different communication protocols via one or more networks 212. The lock devices 202 may include one or more computing devices that execute one or more software programs to perform various processes (e.g., method 700 of FIG. 7). The lock devices 202 may include one or more processors and non-transitory, computer-readable medium or memory including instructions, which, when executed by the processor(s), cause the processor(s) to perform methods disclosed herein. The processor(s) may include any number of physical, hardware processors that execute software to perform the functions described herein. By way of example, the hardware components may be configured to control an operation of the locking mechanisms 222 of the lock devices 202 such that the actuators 224 transition (e.g., actuate, move, rotate, pivot, extend, retract) the locking mechanisms 222 between a locked state (e.g., a locked position, an engaged position) and an unlocked state (e.g., an unlocked position, a disengaged position). By way of another example, the hardware components may be configured to transmit a signal associated with sensor data captured by the one or more sensors 228 of the lock devices 202 to one or more other components of the system 200 (e.g., other lock devices 202, the hub 206, the server 208, the database 210, the user device 216, and/or any other component of the system 200).

The user device 216 (e.g., a mobile electronic device, a controller, a smartphone, a tablet, a laptop computer, a desktop computer, a smartwatch, or the like) may be any type of electronic device comprising hardware components (e.g., one or more processors, non-transitory storage medium, user interface) and software components capable of performing the various processes and tasks described herein. By way of example, the user device 216 may be distinct from the computing device of FIG. 1, however, the user device 216 may be the same computing device 108 of FIG. 1, in which case the description is incorporated herein. Non-limiting examples of the user device 216 include personal computers (e.g., laptop computers, desktop computers), server computers, mobile devices (e.g., smartphones, tablets), VR devices, and gaming consoles, smart watches, among other types of electronic devices. In an illustrative embodiment, the user device 216 is a mobile electronic device executing one or more mobile applications that are configured to communicate with (e.g., transmit to and receive from) the various components of the system 200. The user device 216 may include an electronic display, a user interface, communication electronics, and a physical housing.

Figure 7:
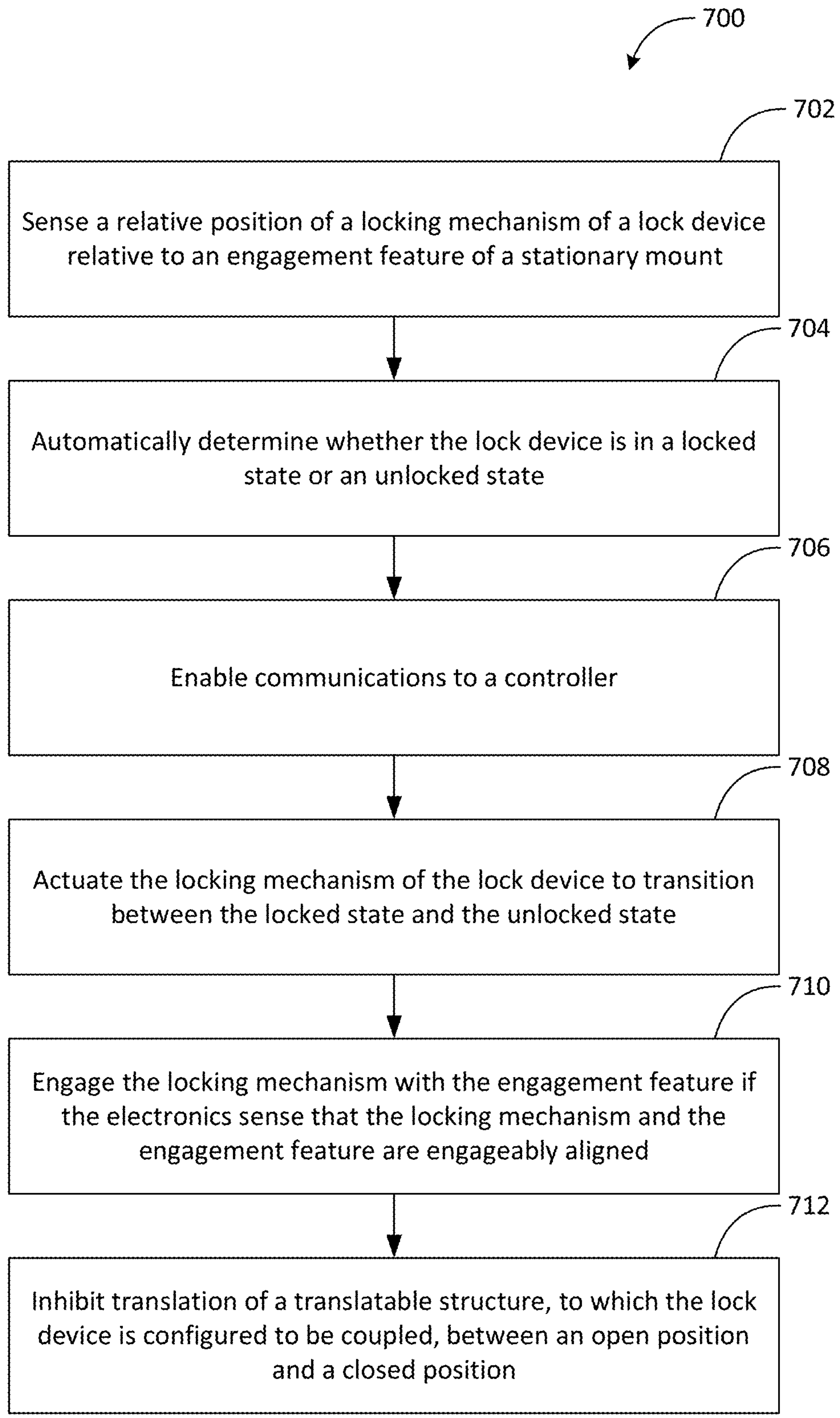
FIG. 7 is a flow diagram of an illustrative method for controlling and operating a lock system configured to be used with a translatable structure, according to an embodiment.

The user device 216 may include one or more computing devices configured to execute one or more software programs (e.g., mobile applications or apps) to perform various processes (e.g., method 700 of FIG. 7). In some embodiments, the user device 216 may be a computer or computing device capable of performing the same or similar methods disclosed herein as performed by the user device 216. The user device 216 may include one or more processors and non-transitory, computer-readable medium including instructions, which, when executed by the processor(s), cause the processor(s) to perform methods disclosed herein. Although FIG. 2 shows only a single user device 216, the user device 216 any include any number of devices associated with one or more users. In some cases, the computing devices of the user device 216 may perform all or portions of the processes of the first lock device 202*a*, the second lock device 202*b*, and/or the hub 206.

By way of example, the user of the system 200 may interact with the user device 216 to select one or more selectable elements 218 or buttons (each element 218 may be associated with corresponding lock devices 202 used to lock corresponding doors, windows, or translatable structures, etc.) to control (e.g., actuate, move) the lock devices 202 between a first state (e.g., locked state, locked position) and a second state (e.g., unlocked state, unlocked position) and/or any state or position therebetween. The user may select the element 220 to indicate whether to control the corresponding lock device 202 from the first state to the second state, the second state to the first state, or any state therebetween. In response to receiving the indications of the selected elements 218, 220, the user device 216 transmits control signals (either directly or indirectly) to the various lock devices 202 corresponding to the selected element 218 to execute the indicated transition between states as indicated by the selected elements 218, 220. In some embodiments, rather than having to interact with multiple elements 218, 220, the elements 218 may control both selection and state of the lock devices 202 by, for example, holding the element 218 for a certain period of time or tap an element multiple times within a maximum time period (e.g., 2 taps within 0.5 seconds). Other user interface elements and processes for interacting with these elements may be provided and utilized in performing the locking and unlocking.

Control and informational signals may be transmitted between the components of the system 200. For example, the signals 214*a*, 214*b*, 214*c*, 214*d*, 214*e*, and/or 214*n* (collectively 214) may be transmitted between and amongst components through the network(s) 212. As described herein, the signals 214 may be transmitted utilizing any suitable communication protocol. According to illustrative embodiments, the signals 214 may be transmitted directly between components of the system 200. Alternatively or additionally, the signals 214 may be transmitted from the lock devices 202 in response to a user changing a lock state thereof or to a single component (e.g., the lock device 202, the hub 206, the server 208, the database 210, the user device 216) and then relayed from the single component to one or more other components of the system 200.

The lock devices 202 include the actuator 224 configured to be in mechanical communication with (e.g., mechanically coupled with, mechanically engaged with) the respective locking mechanisms 222. The actuator 224 may be configured to actuate the locking mechanisms 222 between a locked state and an unlocked state, thereby transitioning the lock devices 202 between a locked state and an unlocked state. The actuators 224 may further be configured to partially actuate the locking mechanisms 222 such that the locking mechanisms 222 are not in the fully locked position or the fully unlocked position (e.g., any position between the locked position and the unlocked position. In some embodiments, when the lock devices 202 are in the unlocked state, the locking mechanisms 222 may be substantially positioned (e.g., retracted) inside housings of the lock devices 202. By way of example, when the lock devices 202 are in the unlocked state, the locking mechanisms 222 may be positioned so as to permit translation of the respective translatable structure. In some embodiments, when the lock devices 202 are in the locked state, the locking mechanisms 222 may extend from the housings of the lock devices 202 so as to inhibit translation of the translatable structure when the locking mechanisms 222 are engaged with an engagement feature of the mount 226.

The actuators 224 may be electromechanical devices configured to convert electrical energy (e.g., from one or more batteries of the lock device 202, from a power supply of the space via a hardwired connection, from a generator, from a power grid, from solar power, or from some other source of power) into mechanical motion (e.g., to actuate the locking mechanism 222). By way of example, the actuators 224 may be solenoids configured to actuate a plunger when the solenoids are energized or de-energized (e.g., receives an actuation signal) to actuate the locking mechanisms 222 between the locked position and the unlocked position. By way of another example, the actuators 224 may be DC motor actuators configured to receive electrical power (e.g., in response to receiving an actuation signal) to generate rotational motion and including a mechanical linkage (e.g., cam and follower, gears, rack and pinion, crank and slider, etc.) configured to mechanically couple the output (e.g., rotational motion) of the DC motor with the locking mechanisms 222 to actuate the locking mechanisms 222 between the locked position and the unlocked position. In other examples, the actuators 224 are another type of electromechanical device (e.g., an AC motor, a stepper motor, a servo motor, a linear motor, a piezoelectric motor, or the like) configured to actuate the locking mechanisms 222 between the locked position and the unlocked position. In some embodiments, the actuators 224 convert electrical energy into linear motion to linearly actuate the locking mechanisms 222 between the locked position and the unlocked position. In other embodiments, the actuators 224 convert electrical energy into rotational motion to rotatably actuate the locking mechanisms 222 between the locked position and the unlocked position.

In one embodiment, the lock device 202 may receive a control signal 214*a* from one or more components of the system 200 (e.g., lock device 202*b*, the hub 206, the server 208, the database 210, the user device 216, and/or any other component of the system 200) commanding the lock device 202*a* to transition between the locked state or the unlocked state (e.g., commanding the actuator 224*a* to actuate the locking mechanism 222*a* between the locked position or the unlocked position). By way of example, in response to receiving the control signal 214*a* indicative of a command to transition the lock device 202*a* to the locked state, the actuator 224*a* may actuate the locking mechanism 222*a* to the locked position from the unlocked position. Similarly, in response to receiving the control signal 214*a* indicative of a command to transition the lock device 202*a* to the unlocked state, the actuator 224*a* may actuate the locking mechanism 222*a* to the unlocked position from the locked position. By way of another example, in response to receiving the control signal 214*a* indicative of a command to transition the lock device 202*a* to either the locked state or the unlocked state, the actuator 224*a* may actuate the locking mechanism 222*a* to the locked position or the unlocked position from any position therebetween.

The lock device 202*a* may receive the control signal 214*a* from the user device 216. In some embodiments, a user may select one or more buttons (e.g., element 218, element 220, or the like) displayed on the interface of or included in the user device 216, wherein each of the one or more buttons is associated with a desired control (e.g., a desired state) of the lock device 202. By way of example, the user may first select one of the elements 218, each element 218 corresponding to respective lock devices 202 (e.g., the first lock device 202*a*, the second lock device 202*b*, a third lock device, etc.) and/or a translatable structure (e.g., a patio sliding door, a kitchen window, a bedroom window, etc.). The user may then select the element 220 to indicate whether to control the corresponding lock device 202*a* from the locked state to the unlocked state, the unlocked state to the locked state, or any state therebetween. In response to receiving the indications of the selected elements 218, 220, the user device 216 may transmit the control signal (either directly or indirectly) to the various lock devices 202 corresponding to the selected element 218 to execute the indicated transition between states as indicated by the selected elements 218, 220.

The lock device 202*a* may receive the control signal 214*a* from the hub 206. In some embodiments, the hub 206 may be configured to receive a communication signal from the user device 216 and translate the communication signal 214*d* into the control signal 214*a* to control the lock device 202*a*. By way of example, the communication signal 214*d* received by the hub 206 from the user device 216 may be associated with an indication to transition the lock device 202*a* between states, and the control signal 214*a* received by the lock device 202*a* from the hub 206 may be associated with a command to transition the lock device 202*a* to the state selected by the user and indicated in the communication signal 214*d*. In some embodiments, the hub 206 may include a user interface configured to receive an input, the input associated with an indication to control the lock device 202*a*, from the user and transmit the control signal 214*a* to the lock device 202*a* to execute the indicated transition between states as indicated by the user input.

The system 200 may implement one or more security protocols/methods to ensure that authorized users can control operation of the lock devices 202. In some embodiments, the user device 216 may prompt the user to validate an authorization before the user is able to control operation of the lock devices 202. By way of example, the user device 216 may prompt the user to enter a password, a one-time passcode, a verification code, or the like. By way of another example, the user device 216 may attempt to identify an identity of the user (e.g., a known person, an identity matched to a profile of a known user in a library, based on facial recognition, based on bio-identification, or the like), and in response to determining that the identification of the user satisfies the authorization, may permit the user to control operation of the lock devices 202.

The lock devices 202 may include one or more sensors 228 configured to monitor operation of the lock devices 202 and the space surrounding the lock devices 202 and transmit a sensor signal associated with the information captured (e.g., detected, sensed, acquired) to other lock devices 202, the hub 206, the server 208, the database 210, the user device 216, and/or any other component of the system 200. The sensor(s) 228 may include any one or more of a proximity sensor, a motion sensor, a position sensor, an accelerometer, a vision sensor, a radar sensor, a camera, a force sensor, a microphone, or the like. In some embodiments, the sensor(s) 228 transmit a signal associated with the collected data to a controller (e.g., a controller of the lock devices 202), and the controller makes a determination based on the received data.

The sensor(s) 228, in some embodiments, may monitor the state, position, location, etc. of the locking mechanisms 222 and transmit a sensor signal indicative of the state, position, location, etc. of the locking mechanisms 222 to other lock devices 202, the hub 206, the server 208, the database 210, the user device 216, and/or any other component of the system 200. In such an embodiment, the sensor(s) 228 may be proximity sensors configured to sense a position (e.g., a distance) of the locking mechanisms 222 relative the housing of the lock devices 202. By way of example, the sensor(s) 228 may be able to detect that the respective locking mechanisms 222 are positioned within or at least partially extended outside of the housings of the lock devices 202, and in response to such a detection, transmit a sensor signal indicative of the position of the locking mechanisms 222 (e.g., the locked position, the unlocked position, and/or any position therebetween). In some embodiments, the sensor(s) 228 are configured to detect the presence and/or absence of the locking mechanisms 222 to determine whether the lock devices 202 are in the locked state or the unlocked state. By way of example, the sensor(s) 228 may be positioned outside of the lock devices 202 (e.g., outside the housing of the lock devices 202, to the mount 226, to a wall or door/window frame, to the translatable structure, etc.) such that the sensor(s) 228 are capable of detecting a presence of the locking mechanisms 222, and thereby determining that the locking mechanisms 222 are in the locked position and that the lock devices 202 are in the locked state. In other embodiments, the sensor(s) 228 may be otherwise positioned (e.g., within the housings of the lock devices 202) to monitor the state, position, location, etc. of the locking mechanisms 222.

The sensor(s) 228, in some embodiments, may monitor a transition between states of the lock devices 202 and transmit sensor signals indicative of the transition to other lock devices 202, the hub 206, the server 208, the database 210, the user device 216, and/or any other component of the system 200. In some embodiments, the sensor(s) 228 are configured to monitor an operation of the actuators 224 to determine whether the lock devices 202 are in the locked state or the unlocked state, or whether the lock devices 202 have transitioned between these states. By way of example, the sensor(s) 228 may be position sensors configured to monitor a position of the actuators 224 to determine whether the lock devices 202 are in the locked state or the unlocked state. In some embodiments, the state in which the lock devices 202 are currently in is stored in a memory (e.g., the database 210). In such an embodiment, the sensor(s) 228 may transmit the state, and a controller (e.g., controllers of the lock devices 202, the hub 206, the server 208, the user device 216) may compare the received state with the stored state. If the received state is different than the stored state, the controllers may make a determination that the lock devices 202 have transitioned between locked and unlocked states, and vice versa.

In some embodiments, the lock devices 202 include one or more sensors 228 configured to monitor operation of the actuators 224 to detect and prevent fatigue the actuators 224. In response to receiving an actuation signal, the actuators 224 actuate the locking mechanisms 222 between the locked and the unlocked positions. In some embodiments, the locking mechanisms 222 may be prevented from fully extending to the locked position or from fully retracting to the unlocked position because of an obstruction (e.g., the mount 226, an opening of the housings of the lock devices 202, or some other obstruction). In such an embodiment, methods may be implemented to prevent damage of the lock devices 202 and/or other components of the system 200 (e.g., actuator 224 fatigue, drain battery power, damage mechanical/electrical components of the actuators 224, damage the locking mechanisms 222, or the like). In some embodiments, the sensor(s) 228 may be position sensors (e.g., limit switch, hall effect sensor, encoder, etc.) configured to stop the actuators 224 from actuating the locking mechanisms 222 in response to a detection that the locking mechanisms 222 are not positioned at the correct location. In some embodiments, the sensor(s) 228 may be force sensors (e.g., a load cell, a strain gauge) configured to sense a force/stress applied to the actuators 224 and stop the actuators 224 from actuating the locking mechanisms 222 in response to a detection that the force/stress exceeded a certain threshold, which may be indicative of an obstruction. In some embodiments, the sensor(s) 228 may be break detectors configured to detect whether the translatable structure has broken (e.g., detect shattered/broken glass, cracked wood, cracked metal, etc.). In some embodiments, the sensor(s) 228 are a current sensors (e.g., a current transmitter) configured to stop the actuators 224 from actuating the locking mechanisms 222 in response to a detection that the current use (e.g., analog output, digital output) of the actuators 224 exceeded a certain threshold, which may be indicative of an obstruction. Additionally or alternatively, the lock devices 202 may employ another type of safeguard (e.g., control logic, manual override) to prevent actuator 224 fatigue and promote overall reliability and durability of the lock devices 202.

The sensor(s) 228, in some embodiments, may monitor a manual actuation of the locking mechanisms 222 and transmit a sensor signal indicative of the manual actuation of the locking mechanisms 222 to other lock devices 202, the hub 206, the server 208, the database 210, the user device 216, and/or any other component of the system 200. In some embodiments, the lock devices 202 may include a manual control feature (e.g., thumb turn, key slot, etc.) in mechanical communication with the locking mechanisms 222 to enable a user to actuate the locking mechanisms 222 between the locked position and the unlocked position. In such an embodiment, the sensor(s) 228 may sense that the locking mechanisms 222 are manually actuated using the manual control feature between the locked position and the unlocked position and in response to sensing the manual actuation, generate a notification signal indicative of a manual state transition and transmit (e.g., communicate) the notification signal to other lock devices 202, the hub 206, the server 208, the database 210, the user device 216, and/or any other component of the system 200.

The sensor(s) 228, in some embodiments, may monitor the space surrounding the lock devices 202 and transmit a sensor signal indicative of the information acquired therefrom to other lock devices 202, the hub 206, the server 208, the database 210, the user device 216, and/or any other component of the system 200.

The sensor(s) 228, in some embodiments, may monitor a relative position of the locking mechanisms 222, and/or the lock devices 202 as a whole, relative to the mount 226, and transmit a sensor signal associated with the acquired information. The sensor(s) 228 may be vision sensors (e.g., a camera), radar sensors, proximity sensors, location sensors, and/or any other sensors. By way of example, the sensor(s) 228 may be configured to determine a distance between the lock devices 202 and the mount 226 and transmit a signal to the user device 216 indicating how far away the translatable structure and the lock devices 202 coupled thereto are from the mount 226. The user may then translate the translatable structure that distance such that the respective locking mechanisms 222 are capable of engaging with the mount 226 (e.g., with an engagement feature thereof) such that the translatable structure is in a locked state (e.g., a locked and an open state, a locked and a closed state). In some embodiments, when the respective lock devices 202 receive a lock signal (e.g., from the user device 216) and the sensor(s) 228 sense that the respective lock devices 202 are in the locked state, the respective lock devices 202 may transmit a feedback signal indicating that the respective lock devices 202 are already in the locked state. The feedback signal may be associated with a command to display a notification on the user device 216 indicating that the respective lock devices 202 are already in the locked state.

In some embodiments, the sensor(s) 228 may monitor a relative position of the locking mechanism **222*a* relative to an engagement feature of the mount 226 to determine whether the locking mechanism 222*a* is substantially aligned with the engagement feature of the mount 226 when the locking mechanism 222*a* is in the unlocked position. The locking mechanism 222*a* and the engagement feature of the mount 226 may be substantially aligned (e.g., within a mechanical alignment that enables locking, such as less than about 5 mm) when the locking mechanism 222*a* is capable of engaging with the engagement feature of the mount 226 such that the translatable structure is in the locked state. In some embodiments, the sensor(s) 228 may be further configured to sense whether the locking mechanism 222*a* is engaged or disengaged with the engagement feature of the mount 226. A user may provide an input to the user device 216 indicative of locking the translatable structure, and, in response to receiving a signal from the user device 216 to lock the translatable structure, the sensor(s) 228 first determine that the locking mechanism 222*a* is substantially aligned with the engagement feature of the mount 226 before the locking mechanism 222*a* is transitioned to the locked position to lock the translatable structure. If the sensor(s) 228 sense that the locking mechanism 222*a* is not substantially aligned with the engagement feature of the mount 226, the locking mechanism 222*a* will not be transitioned to the locked position until the sensor(s) 228 sense that the locking mechanism 222*a* is substantially aligned with the engagement feature of the mount 226. If the sensor(s) 228 sense that the locking mechanism 222*a* is not substantially aligned with the engagement feature of the mount 226, a signal (e.g., a notification) may be transmitted to be displayed on the user device 216 indicating that locking the lock device 202*a* is not possible at that moment because of the misalignment. In some embodiments, the user device 216 displays a real-time status of whether the locking mechanism 222*a* is or is not substantially aligned with the engagement feature of the mount 226, the state of the lock device 202*a*** (e.g., locked or unlocked state), and/or the position of the translatable structure (e.g., open or closed position).

In some embodiments, the sensor(s) 228 are cameras, which may be the same as or similar to the camera 110 described above with reference to FIG. 1, in which case the description is incorporated herein. Additionally or alternatively, the sensor(s) 228 may be other vision sensors configured to monitor the environment surrounding around the lock devices 202 (e.g., a backyard, a front yard, a garage, a driveway, a sidewalk, the space, a living room, a kitchen, a rec room, a dining room, or the like). In such an embodiment, the sensor(s) 228 are in communication with the controllers of the lock devices 202, the hub 206, the server 208, and/or the user device 216 and are configured to generate an environment signal indicative of the space around the lock devices 202 and communicate the environment signal to the hub 206, the server 208, and/or the user device 216. In some embodiments, the user device 216 may display an image (e.g., still frame, incident frame, etc.) and/or a video (e.g., pre-recorded video feed, live feed, etc.) of the information captured by the vision sensor. In some embodiments, the vision sensor communicates the environment signal indicative of the information captured before, after, and/or during a captured event. By way of example, the captured event may be a detection of motion (e.g., a person, an animal, a tree falling, etc.) by the vision sensor, and the vision sensor is configured to communicate the environment signal indicative of the information captured before the detection of motion (e.g., 5 seconds before, 30 seconds before, 1 minute before, etc.), after the detection of motion (e.g., 5 seconds after, 30 seconds after, 1 minute after, etc.), and/or during the detection of motion.

In some embodiments, the controllers of the lock devices 202, the hub 206, the server 208, and/or the user device 216 include imaging processing capabilities for analyzing images, videos, and/or the like captured with the vision sensor. The image processing capabilities may include object detection, facial recognition, gait detection, and/or the like. For example, the controllers of the lock devices 202, the hub 206, the server 208, and/or the user device 216 may analyze or process images from the vision sensor to determine that a package is being delivered at the front door/porch. In other examples, the controllers of the lock devices 202, the hub 206, the server 208, and/or the user device 216 may analyze or process images to detect a child walking within a proximity of a pool, to detect a person within a proximity of a vehicle, to detect a mail delivery person, to detect animals, and/or the like. In some embodiments, the controllers of the lock devices 202, the hub 206, the server 208, and/or the user device 216 may utilize artificial intelligence and machine learning image processing methods for processing and analyzing image and or video captures.

The sensor(s) 228, in some embodiments, may be configured to monitor the force applied to the translatable structure with which the lock devices 202 are coupled and communicate a signal indicative of the force to the controllers of the lock devices 202, the hub 206, the server 208, and/or the user device 216. In such an embodiment, the sensor(s) 228 may be load cells, strain gauges, or another type of sensor configured to monitor the force and/or stress applied to the translatable structure. In some embodiments, the force sensor is directly coupled to a surface of the translatable structure and configured to record a deformation (e.g., a strain, a force, a knock, etc.) thereof. The force sensor may transmit the data associated with the recorded force to be analyzed by the controllers of the lock devices 202, the hub 206, the server 208, and/or the user device 216. In some embodiments, the recorded force is compared against a threshold force to determine the type of force experienced by the translatable structure. By way of example, a force below a first threshold may be indicative of the translatable structure opening and closing, a force above the first threshold and below a second threshold may be indicative of someone knocking on the door, a force above the second threshold and below a third threshold may be indicative of someone attempting to break into the space, and so on. In response to detecting such a force, the user device 216 may display a notification of the type of force experienced by the translatable structure. In some embodiments, in response to a detection that someone attempting to break into the space, a signal may be transmitted to an alarm system to activate the alarm system. The alarm system may be the same as the security system 101 described above with reference to FIG. 1, in which case the description is incorporated herein.

The sensor(s) 228, in some embodiments, may be configured to monitor audio surrounding the lock devices 202. In such embodiments, the sensor(s) 228 may include a microphone or any other sensor configured to detect, record, and transmit audio. The microphone may be the same as the microphone 118 described above with reference to FIG. 1, in which case the description is incorporated herein. In some embodiments, the microphone is configured to capture audio from the surrounding environment, generate an audio signal indicative of the audio captured, and communicate the audio signal to the controllers of the lock devices 202, the hub 206, the server 208, and/or the user device 216. In some embodiments, the microphone captures the audio when the camera captures video, such that the audio is synched with the video. The user device 216 may include a speaker through which the audio may be output for a user to hear.

The information collected from the sensors 228 may be transmitted to and analyzed by the controller of the lock device 202*a*, the hub 206, the server 208, the user device 216, and/or any other component of the system 200. After analyzing the information, the controller of the lock device 202*a*, the hub 206, the server 208, and/or the user device 216 may initiate one or more security protocols, notification protocols, or any other response protocol. By way of example, the output device 230 may be activated (e.g., turned on) in response to a command received from the controller of the lock device 202, the hub 206, the server 208, and/or the user device 216.

The output devices 230, in some embodiments, may be configured as speakers configured to output one or more sounds. The speakers may be the same as the speaker 116 described above with reference to FIG. 1, in which case the description is incorporated herein. In response to receiving a command from the controllers of the lock devices 202, the hub 206, the server 208, and/or the user device 216, the speaker may emit a sound. By way of example, the speakers may output a state of the lock devices 202 and/or the translatable structure (e.g., in response to a transition between states), play the sound of an alarm (e.g., in response to a detection of an intruder), a dog barking, a human speaking, and/or output any other one or combination of sounds. In some embodiments, a user may speak into a microphone included in the user device 216 and the speakers will output the audio that the user spoke. The speakers may be positioned outside of the building to output sounds to the external environment and/or inside the building to output sounds within the space (e.g., a Bluetooth speaker, a home theater system, a doorbell chime, etc.).

The output device 230*a*, in some embodiments, may be configured as a light (e.g., an LED, a spot light, a flood light, etc.) configured to emit light. The light may be the same as the interior light 137 and the exterior light 138 described above with reference to FIG. 1, in which case the description is incorporated herein. In some embodiments, the light is configured to output one or more predefined patterns of light emission (e.g., a strobe effect, a blinking pattern, etc.) and/or colors of light (e.g., blue, red, yellow, white, etc.). In some embodiments, in response to a detection of motion, the light will activate to shine a light on the detected object and its surrounding environment. In some embodiments, the light is an LED configured to emit a predefined pattern or color of light indicative of the status of the lock device 202 and the translatable structure. By way of example, the light may emit a solid green light when the lock device 202 is in a locked state and a blinking red light when the lock device 202 is in the locked state.

In some embodiments, the output device 230*a* is configured as an actuator for the translatable structure. The actuator, such as a motor with rollers, cables, chains, pulleys, gears, or otherwise, an electromagnetic device, etc., may be configured to automatically translate the translatable structure between the open and closed positions when the lock device 202*a* is in the unlocked state (e.g., and therefore permits translation of the translatable structure). By way of example, in response to the sensor(s) 228 sensing motion of a user, a control signal may be transmitted to the lock device 202*a* to transition to the unlocked state and to an activation system configured to initiate an opening sequence to drive the actuator to transition the translatable structure to the open position. Similarly, in response to the sensor(s) 228 sensing that a user is walking away from the translatable structure, a control signal may be transmitted to the activation system configured to initiate a closing sequence to drive the actuator 224*a* to transition the translatable structure to the closed position and to the lock device 202*a* to transition to the locked state. By way of another example, a user may provide an input to the user device 216 indicative of a desired position of the translatable structure, and, in response to receiving a signal from the user device 216, the activation system may initiate the opening/closing sequence to drive the actuator to transition the translatable structure to the open/closed position.

Figure 3B:
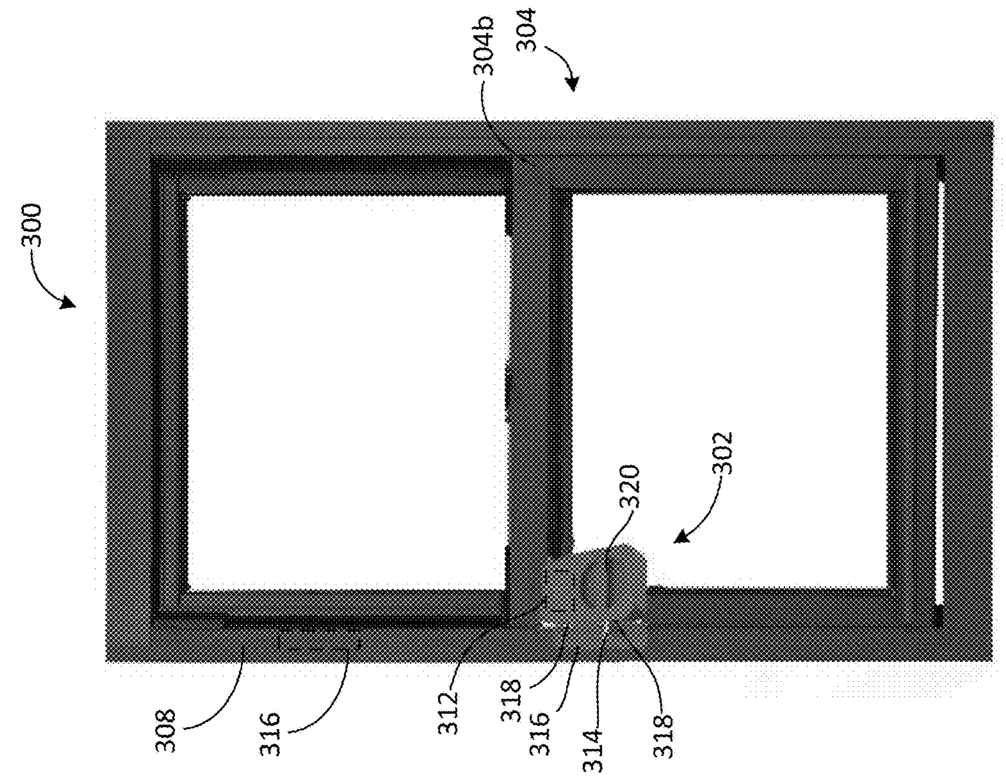
FIG. 3B is a perspective view of an illustrative lock device coupled with a sliding window and window frame, according to an embodiment.
Figure 3A:
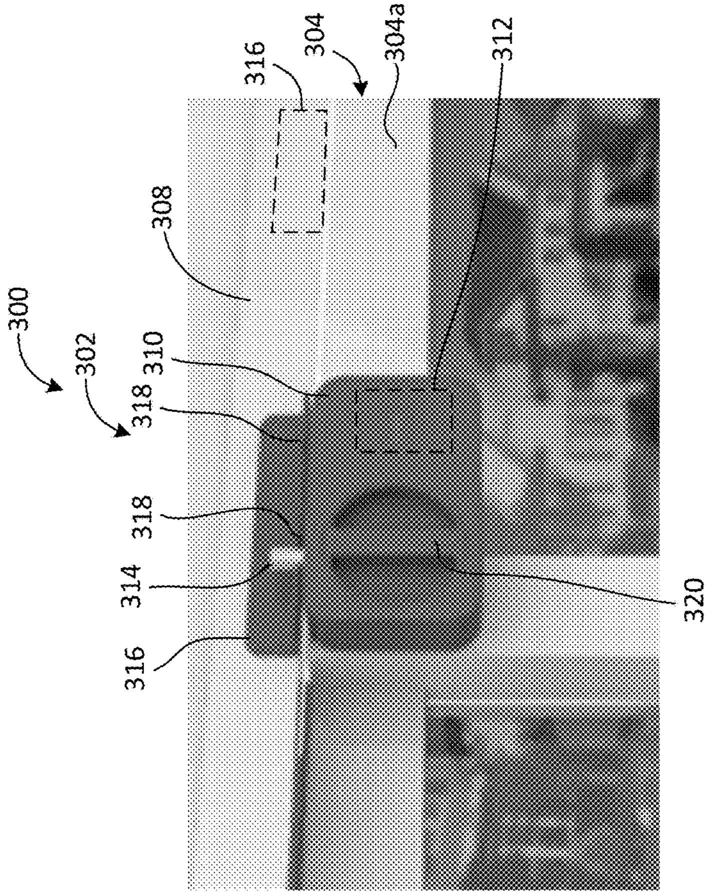
FIG. 3A is a perspective view of an illustrative lock device coupled with a door and door frame, according to an embodiment.

Referring to FIGS. 3A and 3B illustrations of an illustrative lock system 300 including a lock device 302 installed on a translatable structure 304 are shown. The translatable structure 304 illustrated in FIG. 3A is configured as a sliding door 304*a*, and the translatable structure 304 illustrated in FIG. 3B is configured as a sliding window 304*b*. In some embodiments, the translatable structure 304 is another type of translatable structure capable of translating (e.g., laterally, longitudinally, vertically) with respect to a wall or frame 308. The wall 308 includes an opening including the translatable structure 304 that facilitates selective access to a space of a building by translating between a closed position and an open position. The lock system 300 and the lock device 302 may be the same as the system 200 and the lock device 202, respectively, described above with reference to FIG. 2, in which case the description is incorporated herein.

The lock device 302 may include a housing (e.g., a base, a box, an enclosure, a casing, or the like), shown as housing 310, coupled to the translatable structure 304 such that as the translatable structure 304 translates, the housing 310 translates therewith. The housing 310 may be selectively coupled to the translatable structure 304 to facilitate removing the lock device 302 to service one or more components thereof, charge a battery, replace one or more components, or the like. In an alternative embodiment, the housing 310 may be selectively coupled to a fixed structure, such as a wall or frame of a door or window. The housing 310 may include one or more components of the lock device 302 including an actuator (e.g., actuator 224), an energy storage device (e.g., rechargeable battery), sensors (e.g., sensors 228), a controller, and/or any other mechanical or electrical components associated with the operation of the lock device 302, collectively shown as electronics 312. In some embodiments, the lock device 302 draws power from an energy storage device included in the housing 310, a solar panel configured to convert solar energy to electrical energy, and/or is hardwired to another power source (e.g., a generator, a power grid, etc.) to operate one or more components thereof. In some embodiments, the lock device 302 may capture the energy as a result of opening and closing the translatable structure 304 (e.g., translating the translatable structure 304 between open and closed positions) to charge the lock device 302 to reduce changing energy storage devices or requiring separate charging. For example, the lock device 302 may use a super capacitor to store the power of the translatable structure 304 opening and closing to recharge the energy storage devices.

The lock device 302 may include a locking mechanism (e.g., a bolt, a hook, a lock, etc.), shown as locking mechanism 314, configured to actuate between a locked position and an unlocked position. The locked position of the locking mechanism 314 and a locked state of the lock device 302 may be the same, and the description may be used interchangeably throughout. Similarly, the unlocked position of the locking mechanism 314 and an unlocked state of the lock device 302 may be the same, and the description may be used interchangeably throughout. The locking mechanism 314 may be mechanically coupled with an actuator (e.g., motor, solenoid, etc.) configured to, in response to receiving an actuation signal (e.g., from a user device, from a hub, etc.), actuate the locking mechanism 314 between the locked and the unlocked positions.

As shown, the lock system 300 may include a stationary mount 316 (e.g., a bracket, an engagement, a flange, a locking mechanism receiver), shown as mount 316, coupled to the wall defining the space or a frame (e.g., a door frame, a window frame) supporting the translatable structure 304. In an alternative embodiment, the mount 316 may be coupled to the translatable structure 304 and the lock device 302 may be coupled to the wall or frame 308. The mount 316 may include a first surface configured to be coupled to the wall 308 (or a frame of the door 304*a*/window 304*b*) and a second surface extending substantially perpendicular therefrom. The mount 316 may include one or more engagement features (e.g., receivers, apertures, holes, anchor points, surfaces), shown as engagement features 318 (see also FIGS. 4A and 4B), configured to engage with the locking mechanism 314 when the locking mechanism 314 is in the locked position to inhibit translation of (e.g., lock) the translatable structure 304 (e.g., in a locked open position or in a locked closed position). By way of example, when the locking mechanism 314 is engaged with the engagement feature 318, the door 304*a* may be inhibited from sliding in a lateral direction between open and closed positions, and the window 304*b* may be inhibited from sliding in a vertical direction between open and closed positions. The engagement features 318 may be included on the second surface of the mount 316.

The mount 316 may include two or more engagement features 318 spaced (e.g., laterally in FIG. 3A and vertically in FIG. 3B) apart from each other along the mount 316 to facilitate locking the translatable structure 304 at different positions. By way of example, the mount 316 may include a first engagement feature 318 positioned along the mount 316 at a first position such that when the locking mechanism 314 is engaged with the first engagement feature 318, the translatable structure 304 may be in a locked state and a closed position. Similarly, the mount 316 may include a second engagement feature 318 positioned along the mount 316 at a second position such that when the locking mechanism 314 is engaged with the second engagement feature 318, the translatable structure 304 may be in a locked state and an open position. The second engagement feature 318 may be positioned such that when the translatable structure 304 is in the locked state and the open position, a gap formed by the translatable structure 304 is small enough to prevent someone (e.g., a person, a thief, an intruder) from entering/exiting the space, but large enough to permit a pet (e.g., a dog, a cat, etc.) to enter/exit the space, large enough to facilitate air circulation within the space, or any other circumstance.

The mount 316 may be a unitary structure formed of a monolithic material extending in a direction that the translatable structure 304 is capable of translating (e.g., in a lateral direction for the door 304*a*, a vertical direction for the window 304*b*). In some embodiments, the mount 316 extends along a substantial entirety of the length of the opening defined by the wall 308 and including the translatable structure 304. In such an embodiment, the mount 316 may include multiple engagement features 318 spaced (e.g., evenly, variably) along the length of the mount 316 to facilitate locking the translatable structure 304 at different positions. In other embodiments, the lock system 300 includes two or more mounts 316 (each including engagement features 318) coupled to the wall 308 and spaced along the length of the opening defined by the wall 308 to facilitate locking the translatable structure 304 at different positions. In yet other embodiments, the mount 316 is otherwise spaced or structured to facilitate inhibiting translation of the translatable structure 304. In some embodiments, the lock system 300 includes two or more lock devices 302 spaced along the translatable structure 304 to facilitate locking the translatable structure 304 at different positions.

Referring to FIG. 3A, the lock device 302 and the mount 316 are shown coupled to the door 304*a* and the wall 308 (or frame), respectively, proximate an upper edge of the door 304*a*. Additionally or alternatively, the lock device 302 and the mount 316 may be coupled to the door 304*a* and the wall 308, respectively, proximate a lower edge of the door 304*a*. In some embodiments, the door 304*a* is oriented to translate vertically (e.g. a garage door). In such an embodiment, the lock device 302 and the mount 316 may be coupled to the door 304*a* and the wall 308, respectively, proximate a left and/or a right edge of the door 304*a*.

Similarly, referring to FIG. 3B, the lock device 302 and the mount 316 are shown coupled to the window 304*b* and the wall 308, respectively, proximate a left edge of the window 304*b*. Additionally or alternatively, the lock device 302 and the mount 316 may be coupled to the window 304*b* and the wall 308, respectively, proximate a right edge of the window 304*b*. In some embodiments, the window 304*b* is oriented to translate laterally. In such an embodiment, the lock device 302 and the mount 316 may be coupled to the window 304*b* and the wall 308, respectively, proximate an upper and/or a lower edge of the window 304*b*.

As shown, the housing 310 may include a manual control feature (e.g., a thumb turn, a manual lock, a key, etc.), shown as thumb turn 320, configured to facilitate a user to manually transition the lock device 302 between the locked state and the unlocked state. In other words, the thumb turn 320 facilitates the user to manually actuate the locking mechanism 314 between the locked position and the unlocked position. By way of example, the user may manually translate the translatable structure 304 such that the lock device 302 and the mount 316 are engageably aligned (e.g., substantially aligned) with each other, then turn the thumb turn 320 to actuate the locking mechanism 314 to the locked position and thereby inhibit translation of the translatable structure 304. In some embodiments, the thumb turn 320 is another type of manual control feature to facilitate manually locking and unlocking the lock device 302. By way of example, the manual control feature may be a key hole shaped to receive a key to lock and unlock the lock device 302. If the thumb turn 320 is manually operated, the electronics 312 may detect the transition and save/timestamp the transition and optionally communicate the sensed transition to a local or remote controller or other system.

The electronics 312 may include one or more components (e.g., sensors, communication interfaces, controllers, actuators, output devices, etc.) in communication with other lock devices 302, a hub (e.g., hub 206), a server (e.g., server 208), a database (e.g., database 210), and/or a user device (e.g., user device 216) via a network (e.g., network 212) of FIG. 2. The electronics 312 may include one or more sensors (e.g., sensor(s) 228) configured to sense a relative position of the locking mechanism 314 relative to the engagement features 318 and determine whether the lock device 302 is in the locked state or the unlocked state.

The electronics 312 may be further configured to enable communications to the user device configured to actuate the locking mechanism 314 of the lock device 302 between the locked state and the unlocked state to engage and disengage the locking mechanism 314 with the engagement feature 318 of the mount 316 when the electronics 312 sense that the locking mechanism 314 and the engagement feature 318 are engageably aligned. The term "engageably aligned" may refer to a state in which the locking mechanism 314 and the engagement feature 318 are positioned relative to each other in such a manner that the locking mechanism 314 is capable of engaging with (e.g., being received by) the engagement feature 318. By way of example, the locking mechanism 314 and the engagement feature 318 may be engageably aligned when actuating the locking mechanism 314 to the locked position or state results in the lock device 302 inhibiting translation of the translatable structure 304.

In some embodiments, the electronics 312 may include a proximity sensor (e.g., an inductive proximity sensor used to detect metallic objects, a capacitive proximity sensor used to detect non-metallic objects) configured to detect the presence or absence of the engagement feature 318, which may be metallic or non-metallic, relative to the locking mechanism 314. By way of example, the proximity sensor may emit an electromagnetic field and detect changes in the electromagnetic field caused by the presence of the engagement feature 318. In other embodiments, the electronics 312 may include an optical sensor (e.g., photoelectric sensors, laser sensors, cameras, etc.) configured to emit a light and measure a reflection or interruption of the emitted light caused by the presence of the engagement feature 318. In yet another embodiment, the electronics 312 may include an ultrasonic sensor configured to emit a sound wave (e.g., a high-frequency sound wave) and measure the time it takes for the sound waves to travel back to the ultrasonic sensor after being interfered or reflected. By way of example, if the emitted sound wave returns to the ultrasonic sensor within a predetermined time threshold (e.g., less than 20 microseconds, less than 50 microseconds, etc.), a determination may be made that the locking mechanism 314 and the engagement feature 318 are engageably aligned. In some embodiments, the electronics 312 include a mechanical switch configured to detect the presence or absence of the engagement feature 318 relative to the locking mechanism 314. By way of example, when the engagement feature 318 come into contact with or otherwise engages with the mechanical switch, a determination may be made that the locking mechanism 314 and the engagement feature 318 are engageably aligned. Similarly, if the mechanical switch is not being contacted or engaged with, a determination may be made that the locking mechanism 314 and the engagement feature 318 are not engageably aligned.

The electronics 312 may be configured to sense a position of the translatable structure 304 to determine whether the translatable structure 304 is in a closed position, an open position, or any position therebetween. The electronics 312 may be further configured to sense whether the locking mechanism 314 is engaged with the engagement feature 318 as well as with which engagement feature 318 the locking mechanism 314 is engaged (e.g., a first engagement feature 318, a second engagement feature 318, etc.).

The electronics 312 may be configured to determine a status of the translatable structure 304 based on the state of the lock device 302, the relative position of the locking mechanism 314 relative to the engagement features 318, whether the locking mechanism 314 is engaged with the engagement feature 318, and the position of the translatable structure 304. The status of the translatable structure 304 may be indicative of whether (i) the translatable structure 304 is in the open position and the locked state, (ii) the translatable structure 304 is in the open position and the unlocked state, (iii) the translatable structure 304 is in the closed position and the locked state, and/or (iv) the translatable structure 304 is in the closed position and the unlocked state. In some embodiments, the electronics 312 communicate a signal associated with the collected (e.g., sensed, acquired, monitored) data of the translatable structure 304, the locking mechanism 314, and the engagement features 318 to other lock devices 302, a hub (e.g., hub 206), a server (e.g., server 208), a database (e.g., database 210), and/or a user device (e.g., user device 216) to be analyzed to determine the status of the translatable structure 304. The status of the translatable structure 304 may be displayed on the user device. In some embodiments, a user may provide an input to the user device indicative of a desired status of the translatable structure 304. In response to receiving a signal associated with the desired status, the lock device 302 may be transitioned to the state associated with the desired states, and the translatable structure 304 may be translated (e.g., manually or automatically) to a position associated with the desired status.

Figure 4B:
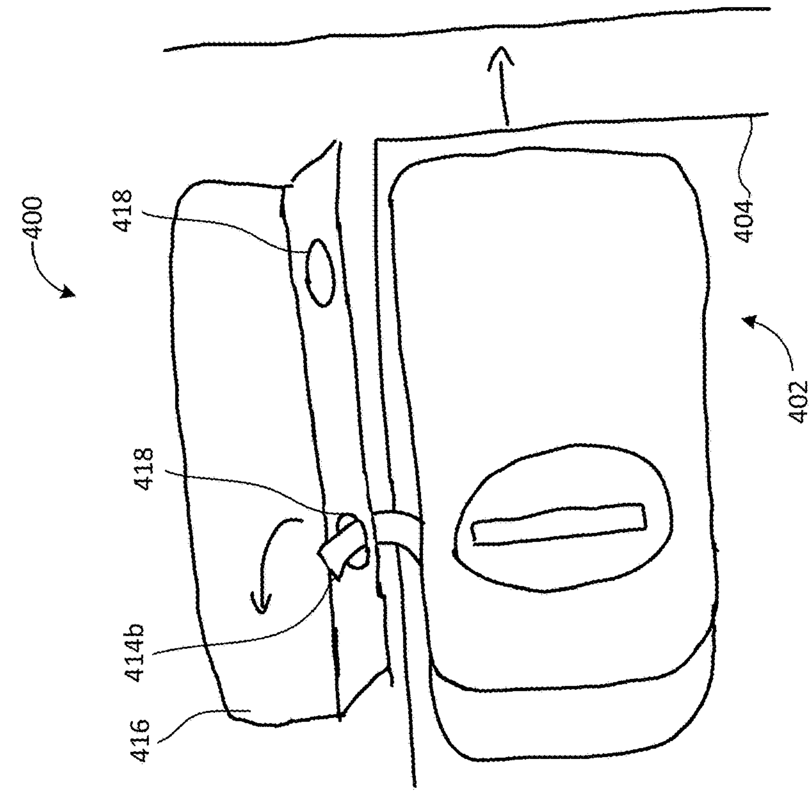
FIG. 4B is a perspective view of an alternative configuration of a lock device including a locking mechanism configured as a rotational bolt, according to an embodiment.
Figure 4A:
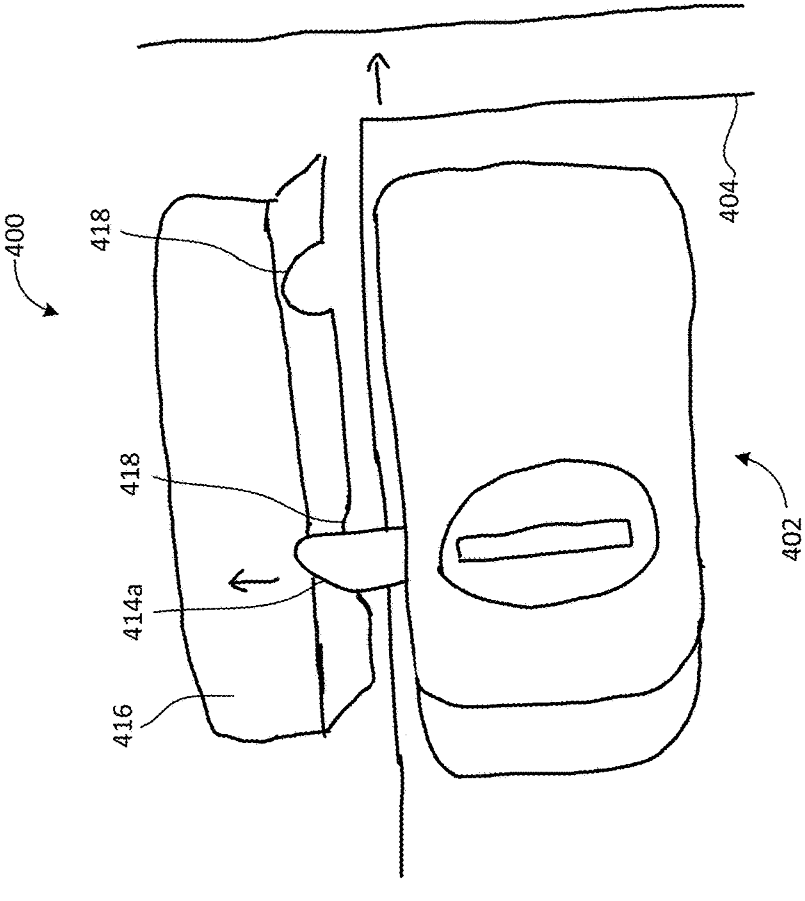
FIG. 4A is a perspective view of an alternative configuration of a lock device including a locking mechanism configured as a tapered bolt, according to an embodiment.

Referring to FIGS. 4A and 4B, illustrations of an illustrative lock device 402 are shown coupled to a translatable structure 404. The lock device 402 includes a locking mechanism 414 configured to actuate between a locked position and an unlocked position. The lock device 402 may be the same as the lock device 202 and 302 described above with reference to FIGS. 2, 3A, and 3B, in which case the description is incorporated herein. The locking mechanism 414 is shown in the locked position and engaged with an engagement feature 418 of a mount 416 coupled to a wall or frame.

As shown in FIG. 4A, the locking mechanism 414 is configured as a bolt, shown as bolt 414*a*. The bolt 414*a* is configured to linearly actuate (e.g., laterally, vertically, longitudinally) between the locked position and the unlocked position. In some embodiments, the bolt 414*a* defines a tapered shape (e.g., angled, domed, arced). The tapered shape of the bolt 414*a* biases the locking mechanism 414, the translatable structure 404, and the lock device 402 coupled thereto to the right (e.g., when viewed from FIG. 4A) when the bolt 414*a* is actuated to the locked position. In some embodiments, the tapered shape of the bolt 414*a* biases the locking mechanism 414, the translatable structure 404, and the lock device 402 coupled thereto in a different direction (e.g., centered or to the left) depending on the orientation of the lock device 402 and the bolt 414*a*.

As shown in FIG. 4B, the locking mechanism 414 is configured as a rotational locking mechanism, shown as rotational bolt 414*b*. The rotational bolt 414*b* is configured to rotationally actuate (e.g., pivot, swing) between the locked position and the unlocked position. The rotational bolt 414*b* is configured to bias the locking mechanism 414, the translatable structure 404, and the lock device 402 coupled thereto to the right (e.g., when viewed from FIG. 4B) when the rotational bolt 414*b* is actuated to the locked position. In some embodiments, the rotational bolt 414*b* biases the locking mechanism 414, the translatable structure 404, and the lock device 402 coupled thereto in a different direction depending on the orientation of the lock device 402 and the bolt 414*a*, and the direction of rotation of the rotational bolt 414*b*.

Figure 5:
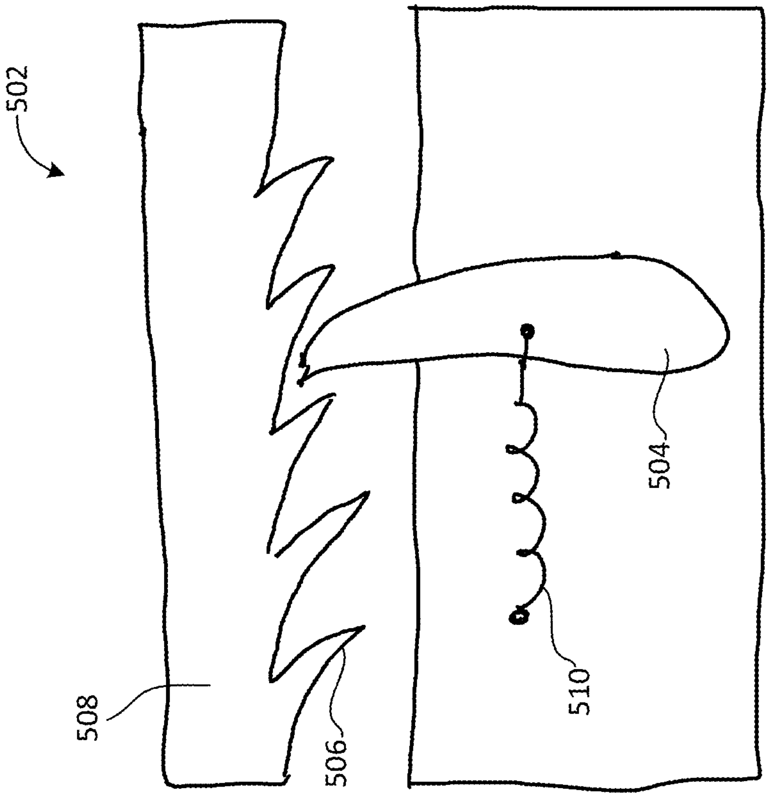
FIG. 5 is a front view of an illustrative locking mechanism configured as a pawl for use with a lock device for a translatable structure, according to an embodiment.

Referring to FIG. 5, an illustration of an illustrative lock device 502 is shown. The lock device 502 includes a locking mechanism configured as a pawl 504. The pawl 504 may be configured to engage with teeth 506 (e.g., engagement features, ratchet, etc.) of a mount 508 to inhibit translation of a translatable structure. By way of example, when the pawl 504 is engaged with one or more teeth 506 of the mount 508 as shown in FIG. 5, the translatable structure and the lock device 502 coupled thereto are inhibited from translating to the left. In another example, the pawl 504 and the teeth 506 may be otherwise oriented to prevent translation in a different direction. At the same time, when the pawl 504 is engaged with the teeth 506, the translatable structure and the lock device 502 coupled thereto are able to translate to the right. By way of example, the pawl 504 and the teeth 506 are shaped such that the pawl 504 slides over the teeth 506 when the translatable structure is translated to the right, but when the translatable structure is translated to the left, the pawl 504 is caught by (e.g., engaged with, wedged by, etc.) the teeth 506, and thereby inhibit translation. In some embodiment, the pawl 504 may be coupled with an actuator configured to actuate the pawl 504 to a disengaged position such that the translatable structure is able to translate in either direction. In some embodiments, a spring 510 is coupled to the pawl 504 to bias the pawl 504 in a direction to be engaged with the teeth 506 of the mount 508.

Figure 6:
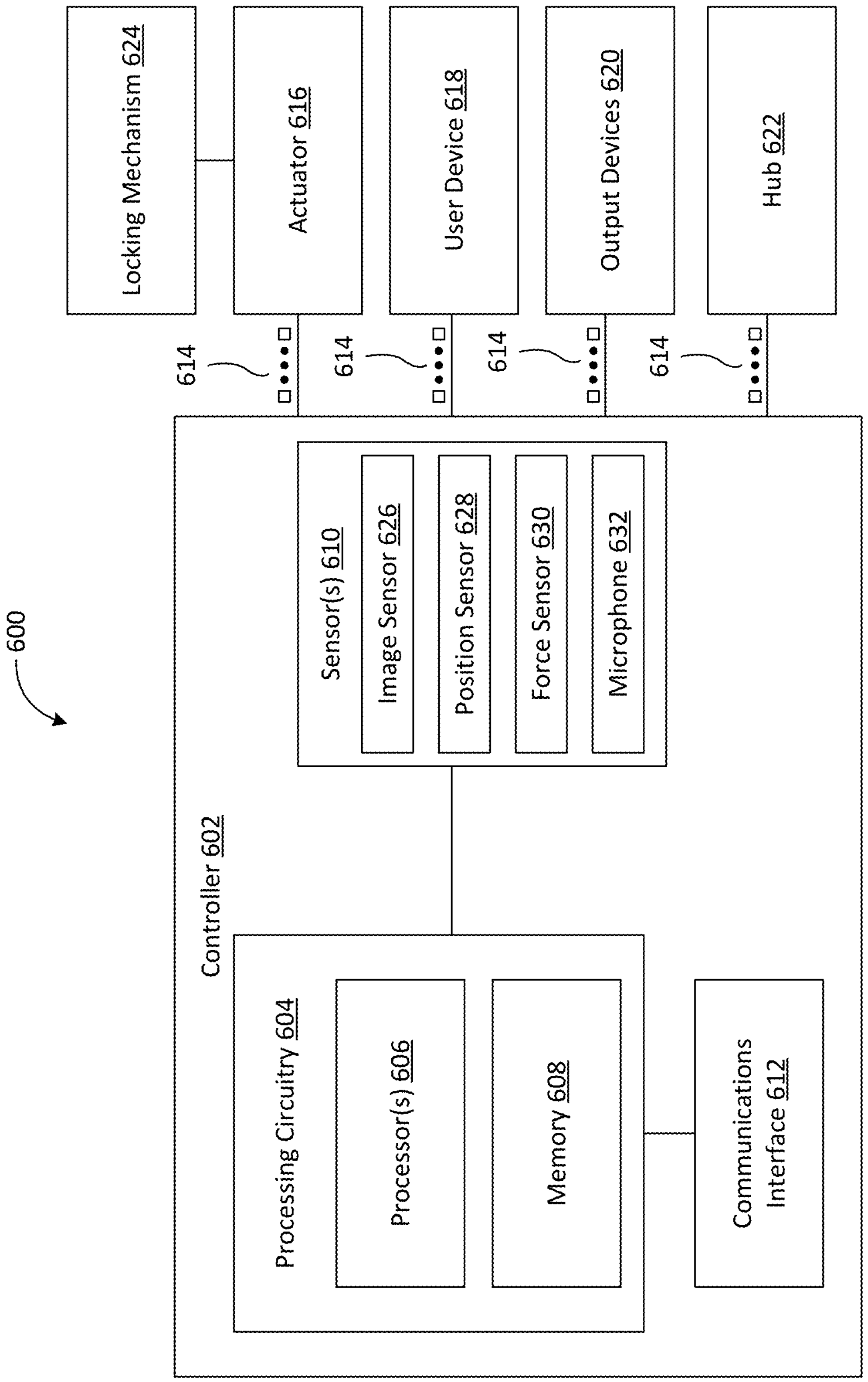
FIG. 6 is a block diagram of an illustrative controller configured to control operation of a lock device configured to be utilized with a translatable structure (e.g., a door or window), according to an embodiment.

Referring to FIG. 6, a block diagram of illustrative circuitry 600 of a controller 602 for use in controlling and operating one or more lock devices (e.g., lock device 202, lock device 302, lock device 402, lock device 502) configured to selectively inhibit translation of a translatable structure, such as a door or a window. The circuitry 600 may be formed of multiple electronic circuits and modules, including processing circuitry 604 including one or more processors 606 and a memory 608, one or more sensors 610, and a communications interface 612 for communicating signals 614*a*-614*n* (collectively 614) (e.g., communication signals, control signals, data signals, etc.) over one or more frequency bands and using one or more different communication protocols, and so on. The processor(s) 606 may be general processors, image processors, digital signal processors, application specific integrated circuits, and/or otherwise configured to execute software to manage operations of the processing circuitry 604 for communicating with and operating the lock devices. It should be understood that other components may be integrated into the controller 602 and be supported by the processing circuitry 604, software being executed thereby, and/or other electronic components.

The communications interface 612 facilitates communications between the controller 602 and an actuator 616 of the lock device, a user device 618 (e.g., mobile phone, panel, hub, or otherwise), one or more output devices 620, and a hub 622. The actuator 616 may be configured to actuate a locking mechanism 624 in response to receiving an actuation signal 614*a* from the controller 602. The actuation signal 614*a* may be indicative of a command to actuate the locking mechanism 624 to the locked position, the unlocked position, or any other position therebetween. By way of example, a user may provide an input to the user device 618 to lock the locking mechanism 624. In response to receiving the input, the user device 618 may transmit a communication signal 614*b* to the controller 602 indicative of the input, and the controller 602 may transmit the actuation signal 614*a* to the actuator 616.

The sensors 610 may include an image sensor 626 (e.g., camera, lidar sensor, radar sensor, infrared sensor, etc.), a position sensor 628 (e.g., a proximity sensor, a motion sensor, etc.), a force sensor 630 (e.g., a strain gauge), a microphone 632 (e.g., an audio sensor), and/or one or more other sensors 610 configured to monitor an operation of the lock device and an environment or space surrounding the lock device. The sensors 610 may be the same or similar as the sensors 228 described above with reference to FIG. 2, in which case the description is incorporated herein. In some embodiments, signals 614 output by the sensors 610 may be processed by the processing circuitry 604 and the signal 614*a* generated by the processing circuitry 604 may be communicated to the actuator 616 to actuate the locking mechanism 624 between the locked position and the unlocked position. In some embodiments, in response to receiving a signal 614*c* generated by the processing circuitry 604 in response to processing data output by the sensors 610, the user device 618, or the hub 622, the output devices 620 may perform one or more processes described herein. By way of example, the output devices 620 may be (i) speakers configured to output one or more sounds, (ii) lights configured to emit light around the surround environment/space, (iii) an actuator configured to automatically translate the translatable structure, and/or (iv) any other device configured to perform an action in response to receiving a signal from the sensors 610, the user device 618, the hub 622, and/or the controller 602.

Referring to FIG. 7, a flow diagram of an illustrative method 700 for controlling an operation of a lock device (e.g., lock device 202, lock device 302, lock device 402, lock device 502) that locks and unlocks a translatable structure is shown. The method 700 may be performed by the lock device utilizing one or more processors executing instructions stored on a non-transitory, computer-readable medium. At step 702, one or more sensors (e.g., a proximity sensor, a motion sensor, a location sensor) may be used to sense a relative position of a locking mechanism of the lock device relative to an engagement feature of a stationary mount, the locking mechanism and stationary mount being configured (i) at the translatable structure and (ii) to engage and disengage with one another so as to be respectively locked and unlocked. At step 704, a determination is made automatically, in response to receiving a sense signal (e.g., from the one or more sensors), as to whether the lock device is in a locked state (e.g., extended) or an unlocked state (e.g., retracted). In some embodiments, the electronics may be configured to monitor whether the lock device is in the locked state or the unlocked state. At step 706, communications may be enabled to a controller such that one or more signals indicative of (i) the relative position of the locking mechanism of the lock device relative to the engagement feature of the stationary mount and/or (ii) whether the lock device is in the locked state or the unlocked state may be transmitted to be displayed on the user device. In some embodiments, the controller is a user device, such as a mobile phone executing a mobile app. At step 708, an actuator is configured to actuate, in response to receiving a command signal, the locking mechanism of the lock device to transition between the locked state and the unlocked state. In some embodiments, a user may provide an input to the user device commanding the actuator to actuate the locking mechanism of the lock device to transition between the locked state and the unlocked state. At step 710, the locking mechanism may be engaged with the engagement feature if the locking mechanism and the engagement feature are sensed to be engageably aligned. In some embodiments, if the locking mechanism and the engagement feature are sensed as not being engageably aligned, steps 702 through 708 may be repeated. At step 712, a translatable structure, with which the lock device may be coupled, is inhibited from translating (e.g., sliding, moving) between an open position and a closed position as a result of the locking mechanism being in the locked state. By way of example, at steps 710 and 712, the locking mechanism may be engaged with the engagement feature in response to determining that the locking mechanism and the engagement feature are engageably aligned, thereby (i) inhibiting translation of the translatable structure between a closed position and an open position when the locking mechanism is engaged with the engagement feature, and (ii) enabling translation of the translatable structure between the closed position and the open position.

It should be understood that the method 700 may include more, fewer, or different steps than described herein, including the methods and processes described in the various figures herein. Likewise, the steps described herein with relation to the method 700 may be executed/performed in any order or timing. The order presented herein is for illustrative purposes only and should not be considered limiting.

Figure 8:
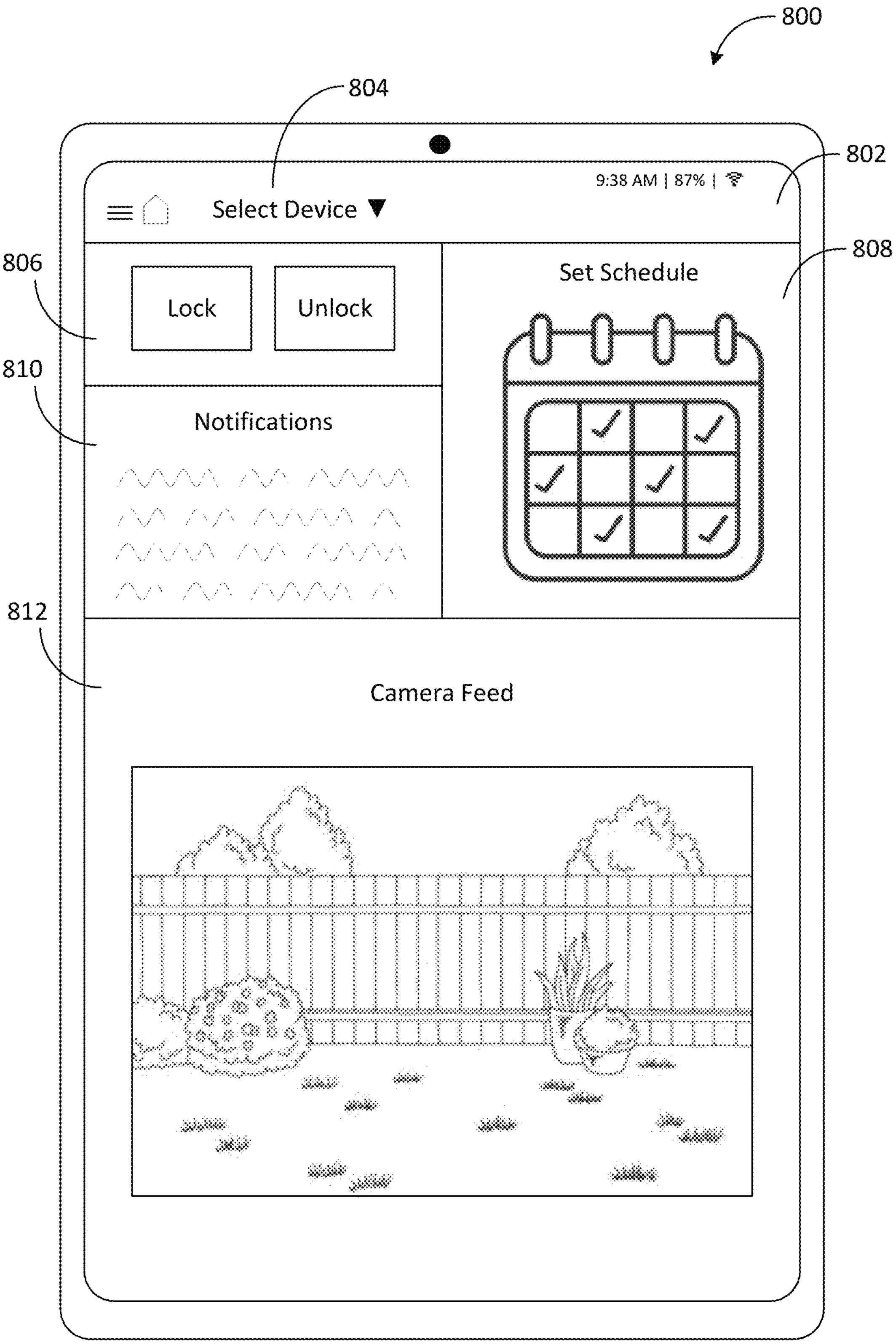
FIG. 8 is a view of a user device configured with a user interface to control operation of a lock system, according to an embodiment.

Referring to FIG. 8, an illustration of an illustrative user device 800 is shown, according to an illustrative embodiment. The user device 800 may include one or more processors executing instructions stored on a non-transitory, computer-readable medium that execute one or more software programs or code to perform the various processed described herein (e.g., the method 700 of FIG. 7). The user device 800 may be a mobile electronic device, a controller, a smartphone, a tablet, a laptop computer, a desktop computer, a smartwatch, or the like. The user device 800 includes a user interface 802 (e.g., an LCD, an LED display, an OLED display, a touch screen, or the like) configured to display information to a user. The user may be able to provide one or more inputs to the user device 800 (e.g., by tapping the user interface 802, interacting with one or more buttons, hand gestures, voice commands, or the like) to control an operation of a lock system (e.g., system 200, lock system 300) and one or more components included therein (e.g., lock device 202, lock device 302, lock device 402, lock device 502, etc.). The user device 800 may be the same as the user interface 119, the user device 216, and the user device 618 described above with reference to FIGS. 1-3, in which case the description is incorporated herein.

The user interface 802 may include a device select element 804 that a user may select to indicate which lock device (e.g., lock device 202, lock device 302, lock device 402, lock device 502, etc.) to control. By way of example, two or more lock devices may be positioned throughout a space and may be associated with two or more translatable structures (e.g., a first lock device associated with a door, a second lock device associated with a window, etc.). In such an example, the user can select to control operation of any available lock device.

The user interface 802 may include a lock device control element 806 that a user may interact with to control the state of the lock device and the translatable structure. By way of example, the user may provide an input to indicate whether to lock or unlock the corresponding lock device selected in the device select element 804. In response to the user selecting to lock the lock device, the actuator may receive an actuation signal and actuate a locking mechanism of the lock device to actuate to the locked position, thereby transitioning the lock device to the locked state. Similarly, in response to the user selecting to unlock the lock device, the actuator may receive an actuation signal and actuate the locking mechanism of the lock device to actuate to the unlocked position, thereby transitioning the lock device to the unlocked state. The lock device control element 806 may include a variety of additional elements further configured to control operation of one or more other components of a lock system (e.g., system 200, lock system 300). By way of example, the user may provide an input to the lock device control element 806 to turn a light ON or OFF, play one or more sounds through a speaker, activate an alarm system, translate the translatable structure automatically to a specific position (e.g., an open position, a closed position, or any position therebetween) by way of an actuation system. In some embodiments, the user interface 802 may prompt the user to validate an authorization before the user is able to control operation of the lock device. By way of example, the user interface 802 may prompt the user to enter a password, a one-time passcode, a verification code, or the like. By way of another example, the user interface 802 may attempt to identify an identity of the user (e.g., a known person, an identity matched to a profile of a known user in a library, based on facial recognition, based on bio-identification, or the like), and in response to determining that the identification of the user satisfies the authorization, may permit the user to control operation of the lock devices.

The user interface 802 may include a schedule element 808 that a user may interact with to set a schedule for the lock device. By way of example, the user can set a schedule via the schedule element 808 to set a time (e.g., period of time, day, week, etc.) to automatically lock or unlock the lock device, control operation of one or more output devices (e.g., turn ON a light), and/or to control any other component of the lock system.

The user interface 802 may include a notification element 810 that displays notifications associated with the operation and/or status of the lock device. The notification element 810 may display the current status of the lock device (e.g., locked or unlocked state) and the current status of the translatable structure to which the lock device is coupled to (e.g., open of closed position). In some embodiments, the notification element 810 displays notifications informing the user of relevant events such as unauthorized access attempts, low battery levels, lock system malfunctions, motion alerts, security alerts, or otherwise.

The user interface 802 may include a camera feed element 812 that displays images and videos captured by the vision sensors of the lock system (e.g., sensors 228, electronics 312, image sensors 626, etc.). The camera feed element 812 may display a live feed of the captured image data. In some embodiments, the user may query a database using the camera feed element 812 to display previously recorded videos and/or images. The camera feed element 812 may include a thumbnail grid for a quick overview of available media, allowing users to select and view full-size images or play videos. The camera feed element 812 may include playback controls, slideshow functionality, and metadata display. In some embodiments, the camera feed element 812 employs accessibility features, such as alternative text and subtitles on videos, predictive object identification (e.g., using a trained AI model), or the like.

Figure 9B:
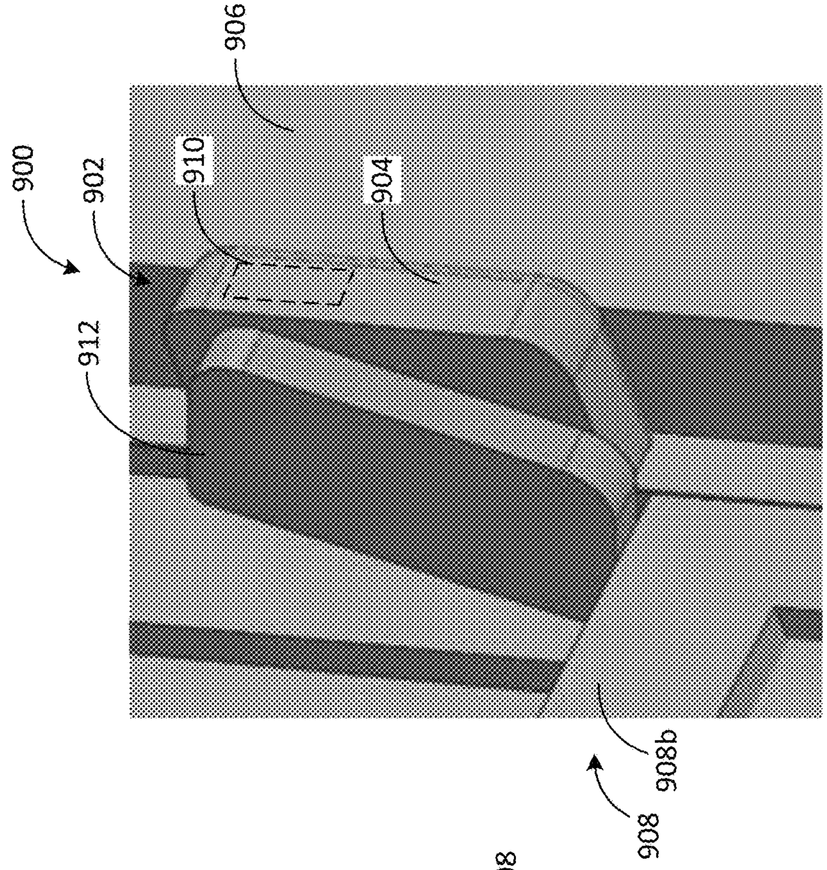
FIG. 9B is a perspective view of a lock system of FIG. 9A including a rotational locking mechanism as applied to a sliding a window, according to an embodiment.
Figure 9A:
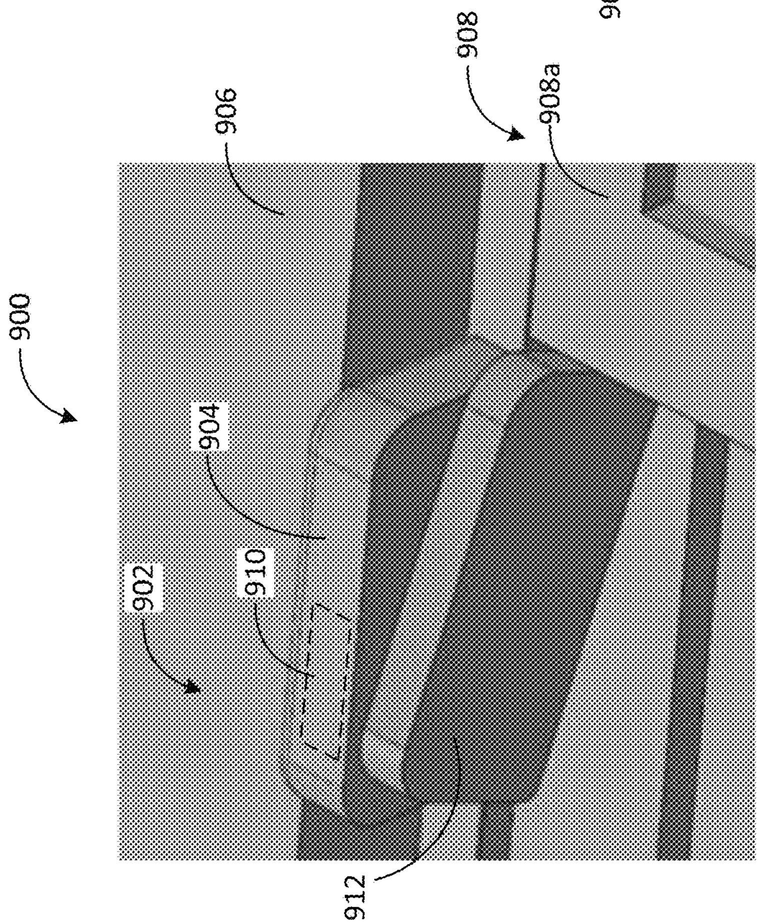
FIG. 9A is a perspective view of an illustrative lock system that operates as a jam including a rotational locking mechanism as applied to a sliding door, according to an embodiment.

Referring to FIGS. 9A and 9B, illustrations of an illustrative lock system 900 are shown, according to an illustrative embodiments, including a lock device 902. The lock device 902 function as a door or window jam so as to prevent or restrict translation of a translatable structure.

The lock device 902 may include a housing (e.g., a base, a box, an enclosure, a casing, or the like), shown as housing 904, configured to be coupled to a wall 906. In some embodiments, the housing 904 is fixedly coupled to the wall 906 or frame of a door or window and includes a cover removable coupled thereto. In other embodiments, the housing 904, and the entire lock device 902, may be removably coupled to the wall 906 (or frame). The wall 906 defines an opening in which a translatable structure 908 (e.g., a sliding door, a garage door, a sliding window, a barn door, or the like) is positioned. The translatable structure 908 is translatable (e.g., movable, slidable, actuatable) between an open position and a closed position to selectively permit access to a space. The translatable structure 908 illustrated in FIG. 9A is configured as a sliding door, shown as door 908*a*, and the translatable structure 908 illustrated in FIG. 9B is configured as a sliding window, shown as window 908*b*. In some embodiments, the translatable structure 908 is another type of translatable structure capable of translating (e.g., laterally, longitudinally, vertically) with respect to the wall 906. The space may be defined by one or more of the walls 906 and include a frame that supports the translatable structure 908. By way of example, the space may be an interior space of a building, such as a house, office, school, shed, garage, apartment, retail store, restaurant, grocery store, and/or any other structure defining a space.

The housing 904 may include one or more components of the lock device 902, including an actuator (e.g., actuator 224, actuator 616), an energy storage device, sensors (e.g., sensors 228, sensors 610), a controller (e.g., controller 106, controller 602), and/or any other mechanical or electrical components associated with the operation of the lock device 902, collectively shown as electronics 910. In some embodiments, the lock device 902 draws power from an energy storage device (e.g., a battery) included in the housing 904, a solar panel configured to convert solar energy to electrical energy, and/or is hardwired to another power source (e.g., a generator, a power grid, etc.) to operate one or more components thereof.

The lock device 902 may include a locking mechanism (e.g., a wedge, a rotatable structure, a bolt, a hook, a lock, etc.), shown as locking mechanism 912, rotatably coupled with the housing 904 and configured to rotatably actuate between a locked position (e.g., a rotated position) and an unlocked position (e.g., an un-rotated position). The locking mechanism 912 may be mechanically coupled with an actuator of the electronics 910 configured to actuate the locking mechanism 912 between the locked position and the unlocked position. In the locked position, the locking mechanism 912 may inhibit translation of the translatable structure 908 between the open position and the closed position. By way of example, and as shown in FIG. 9A, when the locking mechanism 912 is in the locked position, the door 908*a* is inhibited from translating in a first direction (e.g., to the left as viewed from FIG. 9A) to open further (e.g., in a direction towards a fully open position), but is permitted from translating in a second direction that is different (e.g., opposite) from the first direction (e.g., to the right as viewed from FIG. 9A, beyond the lock device 902) to close (e.g., in a direction towards a fully closed position, forward the lock device 902). By way of another example, and as shown in FIG. 9B, when the locking mechanism 912 is in the locked position, the window 908*b* is inhibited from translating in a first direction (e.g., vertically upwards as viewed from FIG. 9B) to open further (e.g., in a direction towards a fully open position, beyond the lock device 902), but is permitted from translating in a second direction that is different (e.g., opposite) from the first direction (e.g., vertically downwards as viewed from FIG. 9B) to close (e.g., in a direction towards a fully closed position, forward the lock device 902).

To inhibit translation of the translatable structure 908, the locking mechanism 912, when in the locked position, may be rotated (e.g., positioned, pivoted) behind the translatable structure 908 to engage with at least a portion thereof. By way of example, the locking mechanism 912 may engage with a frame of the door 908*a* or a frame of the window 908*b* to inhibit translation thereof. In some embodiments, the sensors may be configured to sense a position of the translatable structure 908 relative to the locking mechanism 912. In such an embodiment, the locking mechanism 912 may be configured to rotate from the unlocked position to the locked position in response to the sensors sensing that the translatable structure 908 is in a position that permits the locking mechanism 912 to rotate from the unlocked position to the locked position (e.g., such that the translatable structure 908 is not inhibiting or otherwise blocking rotation of the locking mechanism 908). In some embodiments, the lock system 900 includes two or more lock devices 902 coupled to the wall 906 and spaced along a length of the opening (e.g., in a direction in which the translatable structure 908 is configured to translate) defined by the wall 906 to facilitate inhibiting translation of the translatable structure 908 beyond the two or more lock devices 902 located at different positions. By way of example, a first lock device 902 may inhibit the translatable structure 908 from translating opening farther than a first distance (e.g., 2 inches, 4 inches, 6 inches, 1 foot, etc.) and a second lock device 902 spaced form the first lock device 902 may inhibit the translatable structure 908 from translating opening farther than a second distance, wherein the second distance is larger than the first distance (e.g., 3 inches, 5 inches, 8 inches, 2 feet, etc.).

The electronics 910 may include one or more components (e.g., sensors, communication interfaces, controllers, actuators, output devices, etc.) in communication with other lock devices 902, a hub (e.g., hub 206, hub 622), a server (e.g., server 208), a database (e.g., database 210), and/or a user device (e.g., user device 216, user device 800) via a network (e.g., network 212). The electronics 910 include one or more sensors (e.g., sensors 228, sensors 610) configured to sense a relative position of the locking mechanism 912 relative to the translatable structure 908 and determine whether the lock device 902 is in the locked state or the unlocked state. The electronics 910 may further be configured to enable communications to the user device configured to actuate the locking mechanism 912 of the lock device 902 between the locked state and the unlocked state to inhibit or permit translation of the translatable structure 908 when the electronics 910 sense that the translatable structure 908 is positioned forward the locking mechanism 912 (e.g., in a direction towards a fully closed position). The electronics 910 may be configured to sense a position of the translatable structure 908 to determine whether the translatable structure 908 is in a closed position, an open position, or any position therebetween. The electronics 910 may be further configured to sense whether the locking mechanism 912 is engaged with the translatable structure 908. In some embodiments, the electronics 910 are further configured (i) to sense relative position of a second locking mechanism 912 of the second lock device 902 relative to the translatable structure 908 and (ii) to enable communications to a controller configured to actuate the second locking mechanism 912 of the second lock device 902 between the locked state and the unlocked state to inhibit and permit translation of the translatable structure 908 when the electronics 910 sense that the translatable structure 908 is positioned forward the second locking mechanism 912.

The electronics 910 may determine a status of the translatable structure 908 based on the state of the lock device 902, the relative position of the locking mechanism 912 relative to the translatable structure 908, whether the locking mechanism 912 is engaged with the translatable structure 908, and the position of the translatable structure 908. The status of the translatable structure 908 may be indicative of whether (i) the translatable structure 908 is in the open position and the locked state, (ii) the translatable structure 908 is in the open position and the unlocked state, (iii) the translatable structure 908 is in the closed position and the locked state, and/or (iv) the translatable structure 908 is in the closed position and the unlocked state. In some embodiments, the electronics 910 communicate a signal associated with the collected (e.g., sensed, acquired, monitored) data of the translatable structure 908 and the locking mechanism 912 to other lock devices 902, a hub (e.g., hub 206, hub 622), a server (e.g., server 208), a database (e.g., database 210), and/or a user device (e.g., user device 216, user devices 800) to be analyzed to determine the status of the translatable structure 908. The status of the translatable structure 908 may be displayed on the user device. In some embodiments, a user may provide an input to the user device indicative of a desired status of the translatable structure 908. In response to receiving a signal associated with the desired status, the lock device 902 may be transitioned to the state associated with the desired states, and the translatable structure 908 may be translated (e.g., manually or automatically) to a position associated with the desired status.

In some embodiments, the housing 904 includes a manual control feature (e.g., a thumb turn, a manual lock, a key, etc.) configured to facilitate a user to manually transition the lock device 902 between the locked state and the unlocked state. In other words, the manual control feature facilitates the user to manually actuate the locking mechanism 912 between the locked position and the unlocked position. In some embodiments, the manual control feature is a thumb turn. In other embodiments, the manual control feature is a key hole shaped to receive a key to lock and unlock the lock device 902.

Figure 10B:
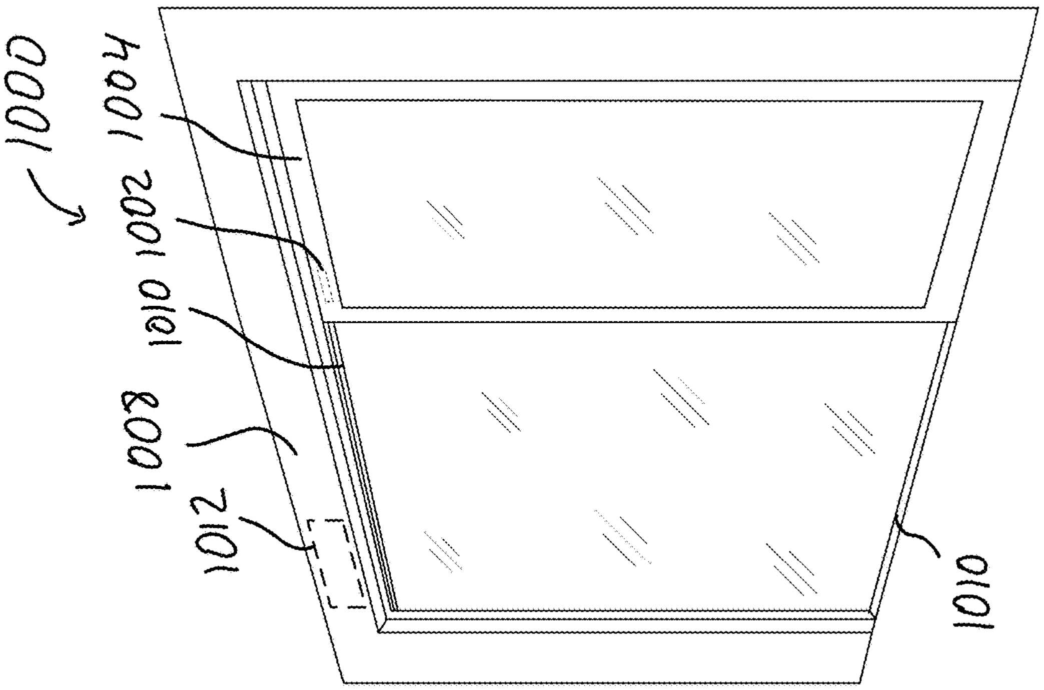
FIG. 10B is a perspective view of a lock system of FIG. 10A including a drive system configured to be used with a translatable structure, according to an embodiment.
Figure 10A:
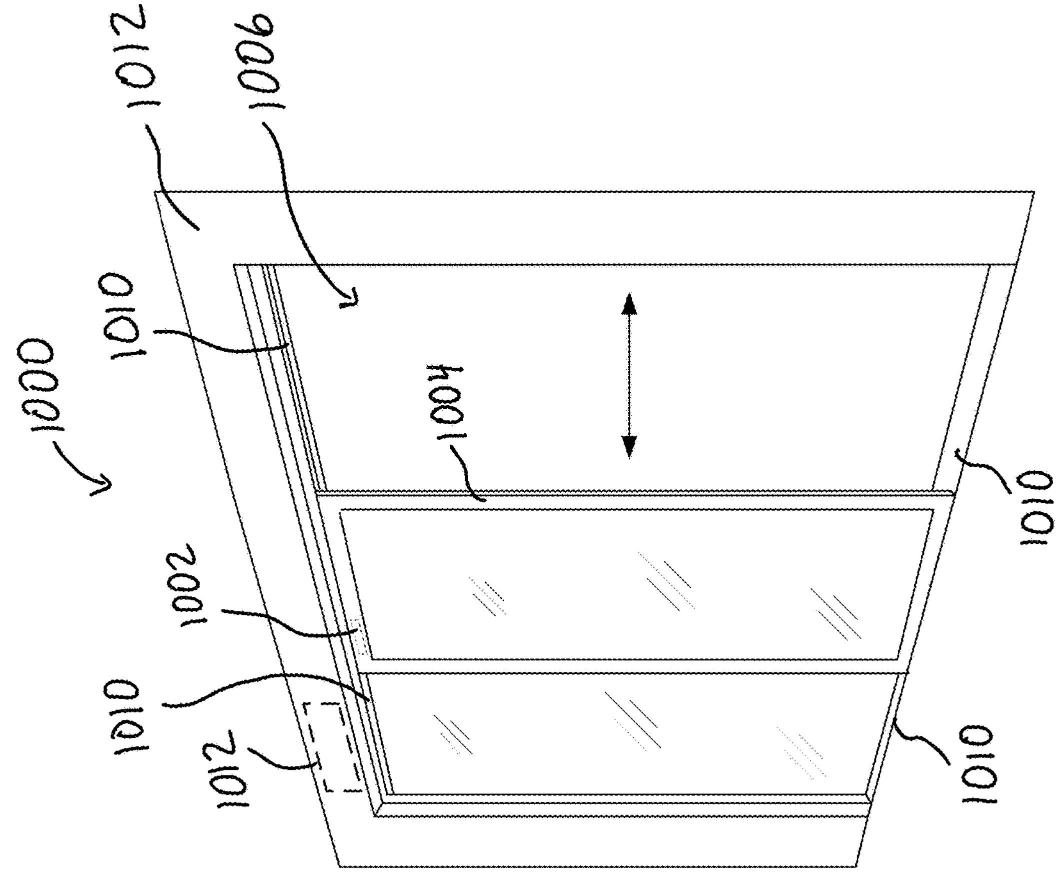
FIG. 10A is a perspective view of an illustrative lock system including a drive system configured to be used with a translatable structure, according to an embodiment.

Referring to FIGS. 10A and 10B, illustrations of an illustrative lock system 1000 are shown including a lock device 1002. The lock device 1002 may be substantially similar and perform substantially similar functions as the lock device 202, lock device 302, lock device 402, lock device 502, and lock device 902 as described herein with reference to FIGS. 1-5, 9A, and 9B. The lock device 1002 may be coupled to a translatable structure 1004 (e.g., a sliding door, a sliding window, etc.) configured to translate between an open position (as shown in FIG. 10A) and a closed position (as shown in FIG. 10B). In some embodiments, the lock device 1002 may be coupled to a wall or a frame. When the translatable structure 1004 is in the open position, access to a space may be permitted. In some embodiments, the open position may be defined as a position where the translatable structure 1004 is fully opened (e.g., fully ajar). In other embodiments, the open position may be defined as a position where the translatable structure 1004 is at least partially open (e.g., partially ajar).

The translatable structure 1004 may translatable and positioned within an opening 1006 defined by a wall 1008. Selectively translating the translatable structure 1004 to the open position may facilitate permitting selective access to the space through the opening 1006. In some embodiments, a frame may be positioned along the outer edges (e.g., perimeter) of the opening 1006 to provide structural support for the translatable structure 1004 during translation thereof and when the translatable structure 1004 is in the open position or the closed position. The frame may include a track 1010 configured to accommodate the translatable structure 1004 to facilitate translation thereof between the open position and the closed position. The track 1010 may be positioned along the wall 1008 and/or the perimeter of the opening 1006 and extend in the same direction (e.g., dimension) in which the translatable structure 1004 is configured to translate. By way of example, the track 1010 may extend along the wall 1008 proximate the top of the translatable structure 1004 and/or proximate the bottom of the translatable structure 1004 (e.g., along a floor). In some embodiments, the translatable structure 1004 may include rollers (e.g., wheels, casters, gears, etc.) configured to be received by or otherwise engaged with the track 1010 to facilitate translation of the translatable structure 1004. Engaging the rollers with the track 1010 may facilitate the translatable structure 1004 being sufficiently supported and aligned within the opening 1006. In other embodiments, the translatable structure 1004 may not include rollers and may be otherwise engaged with the track 1010. In some embodiments, the track 1010 may be a series of gears configured to engage with one or more gears of the translatable structure 1004 to facilitate translation thereof between the open position and the closed position.

The lock system 1000 may include a drive system 1012 configured to automatically translate the translatable structure 1004 between the open and closed positions (e.g., when the lock device 1002 is in an unlocked state). The drive system 1012 may be or include a motor (e.g., AC motor, DC motor, servo motor, etc.) configured to provide sufficient power to translate the translatable structure 1004 along the track 1010. The motor may output a rotational motion which is transmitted one or more other components of the drive system 1012 to produce linear translation of the translatable structure 1004.

The motor may be mechanically engaged with a series of drive components configured to convert the rotational output from the motor to a linear output to translate the translatable structure 1004. In some embodiments, the drive system 1012 may include a belt drive system having a one or more belts (e.g., ropes, chains, cables, etc.) engaged with one or more pulleys. In such an embodiment, the rotational output of the motor may drive the one or more pulleys causing the one or more belts to move. The one or more belts may be engaged with (e.g., received by, wrapped around) a pulley coupled to the translatable structure 1004. Accordingly, the rotational output of the motor may be translated into linear motion, causing the translatable structure 1004 to translate along the track 1010.

In some embodiments, the drive system 1012 may include a gear drive system configured to convert the rotational output from the motor to a linear output to translate the translatable structure 1004. In such an embodiment, the motor may drive a gear attached to a shaft included therewith. The gear may mesh with a rack or another gear system coupled with the translatable structure 1004 such that as the motor rotates, the gear engages with the rack, transferring rotational output to linear output, thereby translating the translatable structure 1004 along the track 1010.

In some embodiments, the drive system 1012 may include a screw drive system configured to convert the rotational output from the motor to a linear output to translate the translatable structure 1004. In such an embodiment, the motor may drive a threaded screw included therewith. A nut or carriage coupled with the translatable structure 1004 may engage with the threads of the screw such that as the motor rotates, the screw is driven and the nut or carriage translate along the length of the screw, thereby translating the translatable structure 1004 along the track 1010.

In some embodiments, the drive system 1012 may include a hydraulic or pneumatic drive system configured to convert the rotational output from the motor to a linear output to translate the translatable structure 1004. In such an embodiment, the motor may power a pump or compressor to pressurize hydraulic fluid or air. The pressurized fluid or air may then be used to actuate cylinders or pistons attached to the translatable structure 1004. In response to the cylinders or pistons extending or retracting, the translatable structure 1004 may translate along the track 1010.

The drive system 1012 may be in communication with a user device such that a user may control operation thereof. By way of example, a user may provide an input to the user device indicative of a desired position of the translatable structure 1004, and, in response to receiving a signal from the user device, the drive system 1012 may initiate an opening/closing sequence to drive the motor to transition the translatable structure to the indicated desired position. In some embodiments, the drive system 1012 may be configured to provide a signal to the user device in response to an activation thereof. By way of example, when the drive system 1012 drives the motor to translate the translatable structure 1004 between the open and closed positions, the drive system 1012 may transmit a signal to the user device indicating that the translatable structure 1004 has been translated and to what position (e.g., open or closed) it has been translated to.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments. These features and advantages of the embodiments will become more fully apparent from the following description and appended claims or may be learned by the practice of embodiments as set forth hereinafter.

As will be appreciated by one skilled in the art, aspects of the present disclosure may be embodied as a system, method, and/or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present disclosure may take the form of a computer program product embodied in one or more computer readable medium(s) having program code embodied thereon.

Many of the functional units described in this specification have been labeled as modules to emphasize their implementation independence more particularly. For example, a module may be implemented as a hardware circuit comprising custom very large scale integrated ("VLSI") circuits or gate arrays, off-the-shelf semiconductor circuits such as logic chips, transistors, or other discrete components. A module may also be implemented in programmable hardware devices such as an FPGA, programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules and may be embodied in any suitable for and/organized within any suitable type of data structure. The operational data may be collected as a single data set or may be distributed over different locations including over different storage devices, and may exist, at least partially, merely as electronic signals on a system or network. Where a module or portions of a module are implemented in software, the program code may be stored and/or propagated on in one or more computer readable medium(s).

The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a server, cloud storage (which may include one or more services in the same or separate locations), a hard disk, a solid state drive ("SSD"), an SD card, a random access memory ("RAM"), a read-only memory ("ROM"), an erasable programmable read-only memory ("EPROM" or Flash memory), a static random access memory ("SRAM"), a Blu-ray disk, a memory stick, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network, a personal area network, a wireless mesh network, and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture ("ISA") instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the C programming language or similar programming languages.

The computer readable program instructions may execute entirely on the user's computer, partly on the user's computer, as a stand-alone software package, partly on the user's computer and partly on a remote computer 125 or service or entirely on the remote computer 125 or server or set of servers. In the latter scenario, the remote computer 125 may be connected to the user's computer through any type of network, including the network types previously listed. Alternatively, the connection may be made to an external computer (for example, through the Internet using an Internet Service Provider). In some embodiments, electronic circuitry including, for example, programmable logic circuitry, FPGA, or programmable logic arrays ("PLA") may execute the computer readable program instructions by utilizing state information of the computer readable program instructions to personalize the electronic circuitry to perform aspects of the present disclosure.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The schematic flowchart diagrams and/or schematic block diagrams in the Figures illustrate the architecture, functionality, and operation of possible implementations and/or embodiments of apparatuses, systems, methods, and computer program products according to various embodiments of the present disclosure. In this regard, each block in the schematic flowchart diagrams and/or schematic block diagrams may represent a module, segment, or portion of code, which comprises one or more executable instructions of the program code for implementing the specified logical functions.

It should also be noted that, in some alternative implementations and/or embodiments, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

As used herein, a list with a conjunction of and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C." As used herein, "a member selected from the group consisting of A, B, and C and combinations thereof" includes only A, only B, only C, a combination of A and B, a combination of B and C, a combination of A and C or a combination of A, B and C.

Means for performing the steps described herein, in various embodiments, may include one or more of a sliding door lock, a sliding door, a window, a network interface, a processor (e.g., a CPU, a processor core, an FPGA or other programmable logic, an ASIC, a controller, a microcontroller, and/or another semiconductor integrated circuit device), an HDMI or other electronic display dongle, a hardware appliance or other hardware device, other logic hardware, and/or other executable code stored on a computer readable storage medium. Other embodiments may include similar or equivalent means for performing the steps described herein.

The present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

The foregoing method descriptions and the process flow diagrams are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the principles of the present disclosure.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the following claims and the principles and novel features disclosed herein.

As utilized herein, the term "substantially" and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

While the instant disclosure has been described above according to its preferred embodiments, it can be modified within the spirit and scope of this disclosure. This application is therefore intended to cover any variations, uses, or adaptations of the instant disclosure using the general principles disclosed herein. Further, the instant application is intended to cover such departures from the present disclosure as come within the known or customary practice in the art to which this disclosure pertains.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It is noted that any element disclosed in one embodiment may be incorporated or utilized with any other embodiment disclosed herein.

What is claimed is:

1. A lock system, comprising:

a stationary mount configured to be coupled to a first surface located at a wall, the wall defining an opening in which a translatable structure is positioned, the translatable structure configured to translate between an open position and a closed position and to permit access to a space when in the open position, the stationary mount including an engagement feature and a second engagement feature;

a lock device configured to be coupled to a second surface located at the wall and proximate the first surface, the lock device including a locking mechanism configured to engage with the engagement feature of the stationary mount to inhibit the translatable structure from translating between the open position and the closed position in a locked state, the locking mechanism to engage with the second engagement feature to secure the translatable structure in a partially open position in the locked state;

a sensor configured to sense relative position of the locking mechanism relative to the engagement feature and/or the second engagement feature;

electronics configured to determine whether the lock device is in the locked state or an unlocked state; and a communications interface configured to communicate signals, the communication signals comprising:

a first signal indicative of the locking mechanism engaged with the engagement feature in the closed position in the locked state;

a second signal indicative of the locking mechanism engaged with the second engagement feature in the partially open position in the locked state; and a third signal indicative of the locking mechanism in the unlocked state; and a controller in communication with the communications interface, the controller configured to actuate the locking mechanism of the lock device to switch between the locked state and the unlocked state to engage and disengage with the engagement feature and/or the second engagement feature of the stationary mount in response to (i) receiving a signal to cause the controller to actuate the locking mechanism and (ii) the sensor sensing that the locking mechanism and the engagement feature or the second engagement feature are engageably aligned.

2. The lock system of claim 1, wherein the lock device includes a manual control feature that is in mechanical communication with the locking mechanism to enable a user to actuate the locking mechanism of the lock device between the locked state and the unlocked state.

3. The lock system of claim 2, wherein the sensor is configured to sense that the locking mechanism is manually actuated to switch between the locked state and the unlocked state, and the communications interface is configured to, in response to the sensor sensing that the locking mechanism is manually actuated to switch between the locked state and the unlocked state:

generate a notification signal indicative of a manual state transition of the locking mechanism; and communicate the notification signal to the controller.

4. The lock system of claim 1, wherein the second engagement feature is spaced along the stationary mount from the engagement feature, wherein the locking mechanism is configured to engage with the second engagement feature to inhibit the translatable structure from translating between the open position and the closed position.

5. The lock system of claim 4, wherein the sensor is further configured to sense relative position of the locking mechanism relative to the second engagement feature, and the communications interface is configured to communicate signals to the controller configured to actuate the locking mechanism of the lock device to switch between the locked state and the unlocked state to respectively engage and disengage the locking mechanism with the second engagement feature of the stationary mount in response to the sensor sensing that the locking mechanism and the second engagement feature are engageably aligned.

6. The lock system of claim 1, wherein the sensor includes a proximity sensor configured to sense a position of the lock device relative to the stationary mount, thereby sensing that the locking mechanism is engageably aligned with the engagement feature or the second engagement feature.

7. The lock system of claim 1, wherein the locking mechanism is a tapered bolt and the engagement feature and/or the second engagement feature is an aperture defined by the stationary mount, such that the tapered bolt extends through the aperture when the lock device is in the locked state.

8. The lock system of claim 1, wherein the locking mechanism is a rotational bolt and the engagement feature and/or the second engagement feature is an aperture defined by the stationary mount, such that the rotational bolt extends through the aperture when the lock device is in the locked state.

9. The lock system of claim 1, wherein the locking mechanism is a pawl and the engagement feature and/or the second engagement feature is a plurality of teeth defined by the stationary mount, such that the pawl engages with at least one tooth of the plurality of teeth when the lock device is in the locked state.

10. The lock system of claim 1, wherein the lock device includes an actuator configured to actuate the locking mechanism to switch between the locked state and the unlocked state in response to receiving an actuation signal from the controller.

11. The lock system of claim 1, wherein the sensor includes a motion sensor configured to:

sense that the translatable structure is being translated, and the communications interface is configured to, in response to the motion sensor sensing that the translatable structure is being translated:

generate a signal indicative of a translation of the translatable structure; and communicate the signal to the controller.

12. The lock system of claim 1, wherein the sensor includes a vision sensor configured to monitor a surrounding environment around the lock system, and the communications interface is configured to generate an environment signal indicative of the surrounding environment, and communicate the environment signal to the controller.

13. The lock system of claim 12, further comprising a light configured to illuminate the surrounding environment.

14. The lock system of claim 1, further comprising a speaker and a microphone, the microphone configured to capture audio from a surrounding environment around the lock device, wherein the communications interface is configured to generate an audio signal indicative of the audio captured and communicate the audio signal to the controller.

15. The lock system of claim 14, wherein the sensor is configured to determine a type of the audio captured, and the type of the audio captured includes at least one of a knock, a vibration, a voice, or a weather event.

16. The lock system of claim 1, wherein the controller is configured as a mobile app being executed on a mobile device.

17. The lock device of claim 1, further comprising an alarm system including an alarm, wherein the controller is configured to determine whether the alarm system is activated and, in response to determining that the alarm system is activated, initiate activation of the alarm.

18. A method of controlling a lock system of a translatable structure, comprising:

automatically determining:

whether a lock device is in a locked state or an unlocked state, the lock device being configured with the translatable structure so as to inhibit translatable motion of the translatable structure when in a locked state and to enable translatable motion of the translatable structure when in an unlocked state;

whether the lock device is in the locked state when a locking mechanism of the lock device is engaged with an engagement feature of a stationary mount; and whether the locking mechanism is engaged with a second engagement feature of the stationary mount, the engagement feature positioned to secure the translatable structure in a closed position and the second engagement feature positioned to secure the translatable structure in a partially open position;

in response to receiving a command signal to transition the lock device between the unlocked state to the locked state while the lock device is in the unlocked state, automatically determining whether the locking mechanism of the lock device and the engagement feature or the locking mechanism and the second engagement feature of the stationary mount are engageably aligned with one another; and in response to determining that the locking mechanism and the engagement feature or the second engagement feature are engageably aligned, actuating the locking mechanism to engage with the engagement feature or the second engagement feature.

19. A lock system, comprising:

a stationary mount configured to be coupled to a first surface located at a wall defining an opening in which a translatable structure is positioned, the translatable structure configured to translate between an open position and a closed position and to permit access to a space when in the open position, the stationary mount including an engagement feature and a second engagement feature;

a lock device configured to be coupled to a second surface located at the wall and proximate the first surface, the lock device including a locking mechanism configured to engage with the engagement feature of the stationary mount when engageably aligned so as to inhibit the translatable structure from translating between the open position and the closed position in a locked state, the locking mechanism to engage with the second engagement feature to secure the translatable structure in a partially open position in the locked state;

a sensor configured to sense relative position of the locking mechanism relative to the engagement feature and/or the second engagement feature;

electronics configured to determine;

whether the lock device is in the locked state or an unlocked state;

whether the locking mechanism is engaged with the engagement feature in the locked state in the closed position; and whether the locking mechanism is engaged with the second engagement feature in the locked state in the partially open position; and an electronics device in electronic communication with the lock device, the electronic devices configured to enable communications to the electronic device configured to, in response to receiving an input from a user, communicate a control signal to actuate the locking mechanism of the lock device to transition between the locked state and the unlocked state so as to engage and disengage the locking mechanism with the engagement feature and/or the second engagement feature of the stationary mount in response to the sensor sensing that the locking mechanism and the engagement feature or the second engagement feature are engageably aligned.

* * * * *